US012345024B2

(12) United States Patent  
Wang et al.

(10) Patent No.: US 12,345,024 B2  
(45) Date of Patent: Jul. 1, 2025

(54) HIERARCHICAL PLANNING FOR AUTONOMOUS MACHINERY ON VARIOUS TASKS

(71) Applicant: Baidu USA, LLC, Sunnyvale, CA (US)

(72) Inventors: Liyang Wang, Sunnyvale, CA (US); Zhixian Ye, Santa Clara, CA (US); Liangjun Zhang, Cupertino, CA (US)

(73) Assignee: Baidu USA LLC, Sunnyvale, CA (US)

( * ) Notice: Subject to any disclaimer, the term of this patent is extended or adjusted under 35 U.S.C. 154(b) by 504 days.

(21) Appl. No.: 17/879,278

(22) Filed: Aug. 2, 2022

(65) Prior Publication Data

US 2023/0053964 A1 Feb. 23, 2023

Related U.S. Application Data

(60) Provisional application No. 63/233,194, filed on Aug. 13, 2021.

(51) Int. Cl.
*E02F 9/26* (2006.01)
*B60W 20/11* (2016.01)
(Continued)

(52) U.S. Cl.
CPC .............. *E02F 9/265* (2013.01); *B60W 20/11* (2016.01); *B60W 20/12* (2016.01); *B60W 20/15* (2016.01);
(Continued)

(58) Field of Classification Search
CPC ......... B60W 2300/17; B60W 2556/35; B60W 20/11; B60W 20/12; B60W 20/15;
(Continued)

(56) References Cited

U.S. PATENT DOCUMENTS

2019/0220015 A1* 7/2019 Phillips ................... G05D 1/65  
2021/0069910 A1* 3/2021 Oleynik ................ F25D 23/028  
(Continued)

FOREIGN PATENT DOCUMENTS

| EP | 4083335 A2 * | 11/2022 | .............. E02F 3/437 |
| GB | 2342640 A * | 4/2000 | .............. E02F 3/437 |
| NO | 20201174 A1 * | 10/2020 | ........... G05B 19/418 |

OTHER PUBLICATIONS

Jud et al, D. Planning and Control for Autonomous Excavation, IEEE Robotics and Automation Letters, vol. 2, No. 4, Oct. 2017, pp. 2151-2158. (Year: 2017).*

(Continued)

*Primary Examiner* — Russell Frejd  
(74) *Attorney, Agent, or Firm* — Oppedahl Patent Law Firm LLC

(57) ABSTRACT

Autonomous excavator has developed rapidly in recent years because of a shortage of labor and hazardous working environments for operating excavators. Presented herein are embodiments of a novel hierarchical planning system for autonomous machines, such as excavators. In one or more embodiments, the overall planning system comprises a high-level task planner for task division and base movement planning, and general sub-task planners with motion primitives, which include both arm and base movement in the case of an excavator. Using embodiments of the system architecture, experiments were performed for the trench and pile removal tasks in the real world and for the large-scale material loading tasks in a simulation environment. The results show that the system architecture embodiments and planner method embodiments generate effective task and motion plans that perform well in autonomous excavation.

20 Claims, 18 Drawing Sheets

(51) Int. Cl.
*B60W 20/12* (2016.01)
*B60W 20/15* (2016.01)
*B60W 30/095* (2012.01)
*B60W 50/00* (2006.01)

(52) U.S. Cl.
CPC ... *B60W 30/095* (2013.01); *B60W 2050/0028* (2013.01); *B60W 2050/0037* (2013.01); *B60W 2300/17* (2013.01); *B60W 2556/35* (2020.02)

(58) Field of Classification Search
CPC ....... B60W 30/095; B60W 2050/0028; B60W 2050/0037; E02F 9/265; E02F 9/205; E02F 3/437; E02F 3/439; G06Q 10/047; G06Q 10/0631; G06Q 50/40
See application file for complete search history.

(56) References Cited

U.S. PATENT DOCUMENTS

| | | | | |
|---|---|---|---|---|
| 2021/0387350 | A1* | 12/2021 | Oleynik | A47J 44/00 |
| 2022/0137630 | A1* | 5/2022 | Kazemi | G05D 1/246 701/25 |
| 2022/0171390 | A1* | 6/2022 | Phillips | G06N 3/08 |

OTHER PUBLICATIONS

Xiao et al, X. Motion Planning and Control for Mobile Robot Navigation Using Machine Learning: A Survey, Google Scholar, Autonomous Robots, Mar. 2022, pp. 569-597. (Year: 2022).*

Zhao et al, J. TaskNet: A Neural Task Planner for Autonomous Excavator, Google Scholar, 2021 IEEE International Conference on Robotics and Automation (ICRA 2021), May/Jun. 2021, pp. 2220-2226. (Year: 2021).*

Rowe, P. Increasing Productivity for Autonomous Mass Excavation: A Thesis Proposal, Google Scholar, Robotics Institute, Carnegie Mellon University, May 1997, pp. 1-31. (Year: 1997).*

Excavator market size, share & trends analysis report by product, application, region, competitive landscape, and segment forecasts, 2018-2025, 2018. (5pgs).

Velikanov et al., "Economic assessment when creating a comfortable operational environment for a mining excavator operator," In: Journal of Physics: Conference Series, vol. 1515 042044, IOP Publishing, 2020. (5pgs).

Occupational Safety, Health Administration, "Excavation: Hazard recognition in trenching and shoring," OSHA technical manual, 1999. (26pgs).

Zhang et al., "An autonomous excavator system for material loading tasks," Science Robotics, 6(55), 2021. [online], [Retrieved Mar. 20, 2024]. Retrieved from Internet <URL: https://www.science.org/doi/10.1126/scirobotics.abc3164> (5pgs).

Seo et al., "Task planner design for an automated excavation system," Automation in Construction, 20(7):954-966, 2011. [Abstract] (6pgs).

Kim et al., "Intelligent navigation strategies for an automated earthwork system," Automation in Construction, 21:132-147, 2012. [Abstract] (6pgs).

Kim et al., "Task planning strategy and path similarity analysis for an autonomous excavator," Automation in Construction, 112:103108, 2020. [Abstract] (6pgs).

Ha et al.,"Robotic excavation in construction automation," IEEE Robotics & Automation Magazine, 9(1):20-28, 2002. (11pgs).

Zhang et al.,"Research on Trajectory planning and autodig of hydraulic excavator," Mathematical Problems in Engineering, 2017, 2017. (11pgs).

Jud et al.,"Planning and control for autonomous excavation," IEEE Robotics and Automation Letters, 2(4):2151-2158, 2017. [Abstract] (4pgs).

Son et al.,"Expert-emulating excavation trajectory planning for autonomous robotic industrial excavator," In: 2020 IEEE/RSJ International Conference on Intelligent Robots and Systems (IROS), IEEE, 2020. (7pgs).

Adel et al.,"Operator model for construction equipment," In 2008 IEEE/ASME International Conf. on Mechtronic & Embedded Systems & Applications, IEEE, 2008. [Abstract] (4pgs).

K. Kurzer,"Path planning in unstructured environments : A real-time hybrid A* implementation for fast and deterministic path generation for the KTH research concept vehicle," Master's thesis, KTH, Integrated Transport Research Lab, ITRL, 2016. (63pgs).

De Luca et al.,"Control of wheeled mobile robots: An experimental overview," Ramsete, 2001. (46pgs).

Wang et al.,"NavDog: robotic navigation guide dog via model predictive control and human-robot modeling," Proc.of the 36th Annual ACM Symposium on Applied Computing, 2021.(4p).

AGX Dynamics, [online], [Retrieved Mar. 20, 2024]. Retrieved from Internet <URL: https://www.algoryx.se/> 2021. (13pgs).

* cited by examiner

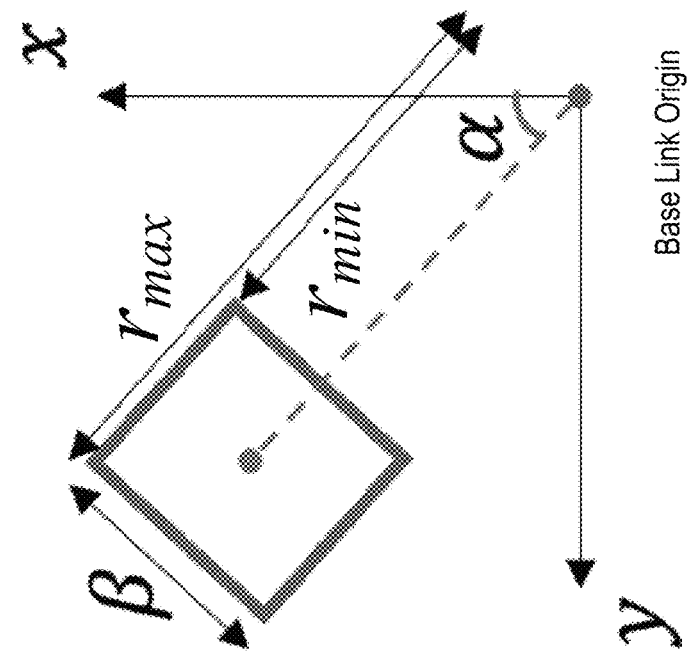
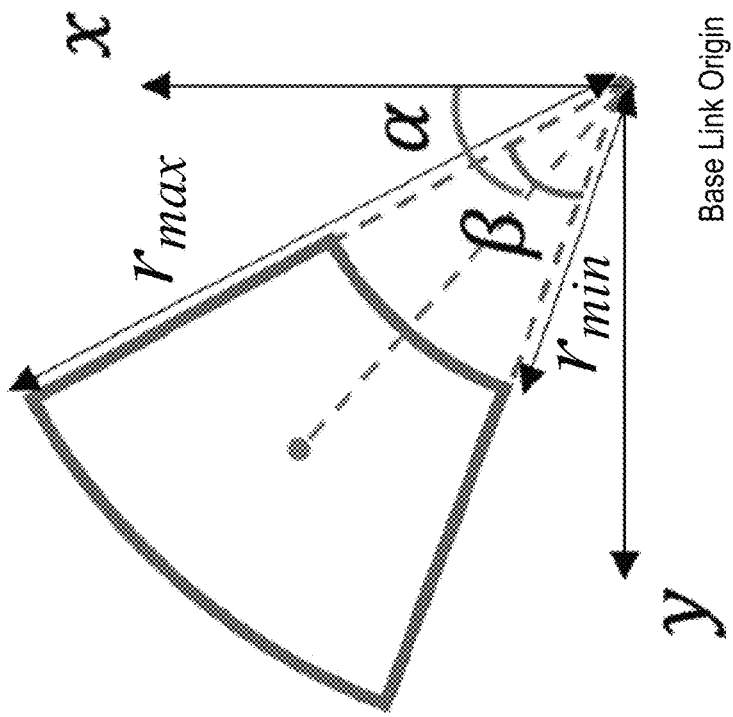
FIG. 4

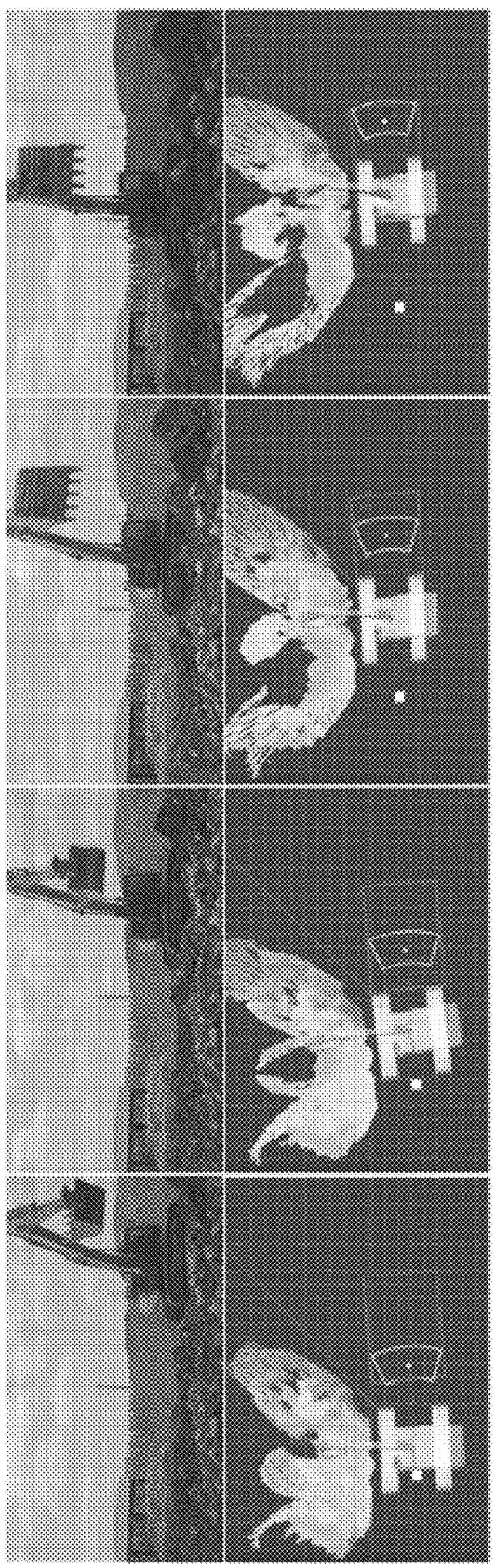

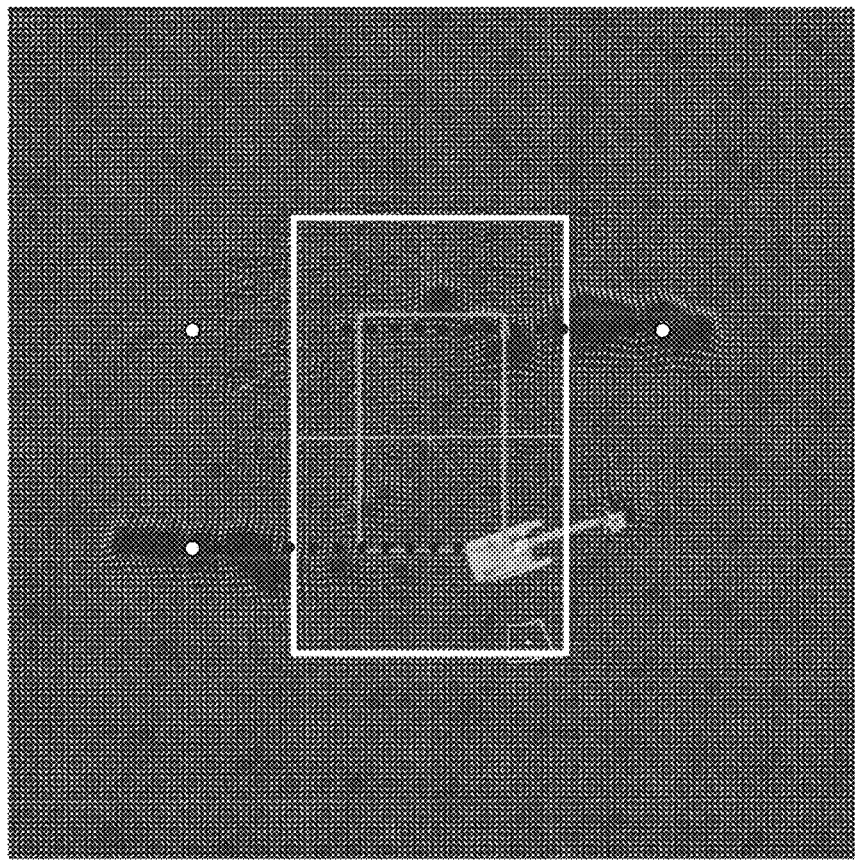
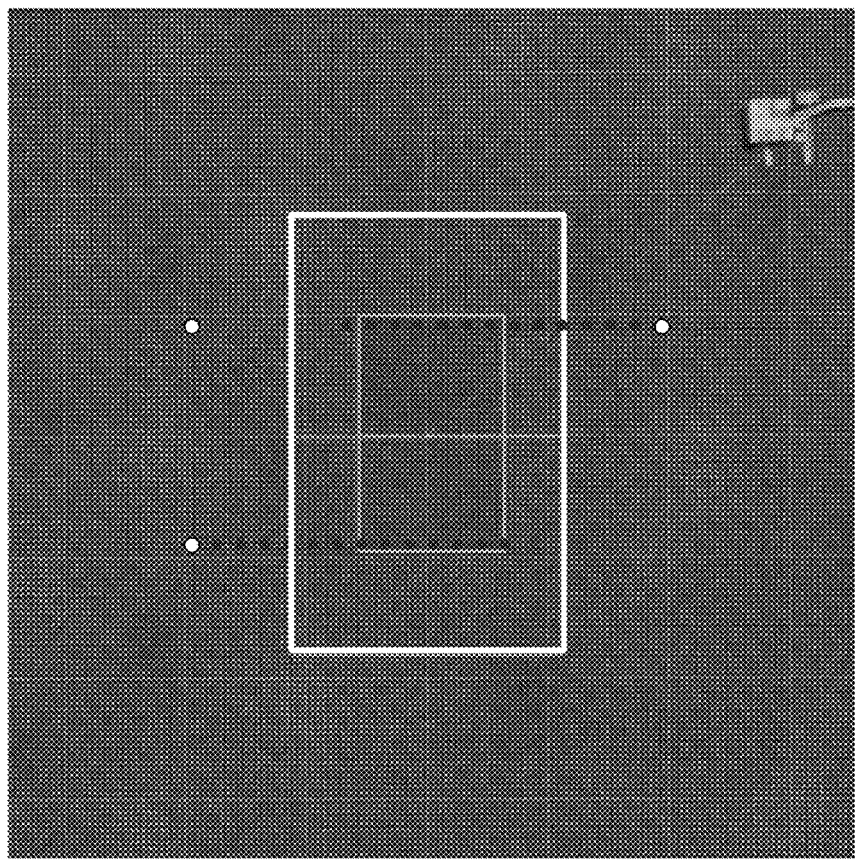
FIG. 16B

HIERARCHICAL PLANNING FOR AUTONOMOUS MACHINERY ON VARIOUS TASKS

CROSS-REFERENCE TO RELATED APPLICATION(S)

This patent application is related to and claims priority benefit under 35 USC § 119 to commonly-owned U.S. Pat. App. No. 63/233,194, filed on 13 Aug. 2021, entitled "HIERARCHICAL PLANNING FOR AUTONOMOUS EXCAVATOR ON MATERIAL LOADING TASKS," and listing Liyang Wang, Zhixian Ye, and Liangjun Zhang as inventors, which patent document is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to autonomous machinery.

B. Background

The last several years has witnessed a dramatic increase in research and development related to autonomous machinery. Autonomous machinery has been investigated for a number of purposes including autonomous car, autonomous truck, autonomous robots, autonomous drones, and autonomous construction vehicles. The rationale for researching and developing autonomous vehicles varies depending upon the application. For example, self-driving cars aid commuters and drivers. Self-driving trucks reduces the costs associated with transporting goods. Autonomous heavy equipment is useful for both reducing costs and reducing the need for humans to work in dangerous situations.

One such vehicle that has seen autonomation research is excavators. Autonomous excavators may potentially be widely used for many different applications, such as moving earth, rock, or other materials. As one of the most versatile heavy equipment, it has a vast market throughout the world. However, a skillful excavator human operator requires extensive training. At the same time, many operation sites are in remote areas with less convenient infrastructures. Moreover, hazardous work environments can impact the health and safety of the human operators on-site.

An autonomous excavator has the advantage of addressing these challenges and improving the overall working condition. In recent years, researchers in both academia and industry have put more and more effort into developing autonomous excavators.

A major challenge for developing autonomous excavators is to design a general planning architecture that is suitable for a wide range of real-world tasks, such as material loading, trench digging, truck loading, among other tasks. In most of the literature, the authors focus on developing key individual components for autonomous excavators, including high-level task planner design, excavation trajectory generation algorithms, and control modules. Despite these advances, there is less research focusing on the planning architecture that connects high-level task planner, sub-task planners, and motion planning for autonomous excavators.

Accordingly, what is needed are systems and methods that provide hierarchical planning for autonomous machinery.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 4 depicts examples of local task region definitions, according to embodiments of the present disclosure.

FIG. 15 depicts pile removal experiment process, according to embodiments of the present disclosure.

FIGS. 16A & 16B depict large-scale pile removal experiment simulations, according to embodiments of the present disclosure.

DETAILED DESCRIPTION OF EMBODIMENTS

Figure 1:
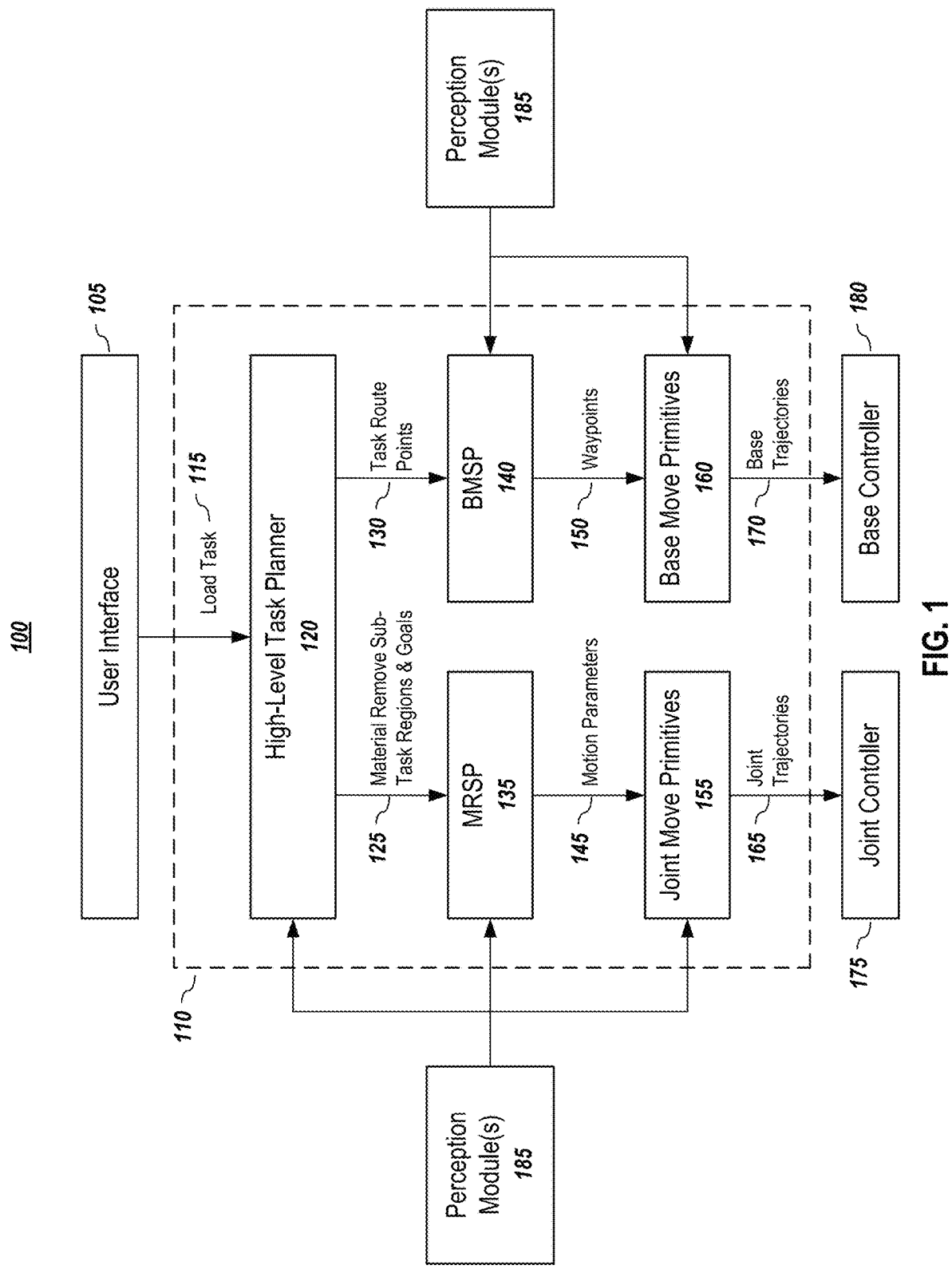
FIG. 1 depicts the planner architecture, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of excavators or heavy equipment, aspects of the present disclosure are not so limited. Accordingly, aspects of the present disclosure may be applied or adapted for use with other machinery or objects and for use in other contexts.

A. General Introduction

As previously noted, a major challenge for developing autonomous excavators is to design a general planning architecture that is suitable for a wide range of real-world tasks, such as material loading, trench digging, truck loading. In most of the literature, the authors focus on developing key individual components for autonomous excavators, including high-level task planner design, excavation trajectory generation algorithms, and control modules.

As for the high-level task planner design, some research has covered autonomous excavation in task division or base move route planning. Seo et al. (Jongwon Seo, Seungsoo Lee, Jeonghwan Kim, and Sung-Keun Kim. Task Planner Design for an Automated Excavation System. *Automation in Construction,* 20(7):954-966, 2011, which is incorporated by reference herein in its entirety) devised a task planner to create optimized work commands for an automated excavator. Some important components of the excavation task planner may be the modules for work area partitioning and excavation path generation. Kim et al., 2012 (Sung-Keun Kim, Jongwon Seo, and Jeffrey S Russell. Intelligent Navigation Strategies for an Automated Earthwork System. *Automation in Construction,* 21:132-147, 2012, which is incorporated by reference herein in its entirety) presented intelligent navigation strategies, which may be useful for an automated earthwork system to execute excavation effectively. Kim et al., 2020 (Jeonghwan Kim, Dong-eun Lee, and Jongwon Seo. Task Planning Strategy and Path Similarity Analysis for an Autonomous Excavator. *Automation in Construction,* 112:103108, 2020, which is incorporated by reference herein in its entirety) allegedly presented a complete coverage path planning (CCPP) algorithm by considering the characteristics of earthwork. Also, a path similarity analysis method was proposed to test the effectiveness of the CCPP algorithm.

Other research has contributed to developing the excavator arm motion generation and controller design. Jud et al. (Dominic Jud, Gabriel Hottiger, Philipp Leemann, and Marco Hutter. Planning and Control for Autonomous Excavation. *IEEE Robotics and Automation Letters,* 2(4):2151-2158, 2017, which is incorporated by reference herein in its entirety) presented a planning and control approach for autonomous excavation in which a single dig cycle is defined with respect to the end-effector force-torque trajectory. Compared with the position trajectories for the bucket motion, it has the advantage that it can overcome the limitations of that soil interaction forces, which are dominant and immensely hard to predict or estimate. Son et al. (Bukun Son, ChangU Kim, Changmuk Kim, and Dongjun Lee. Expert-emulating excavation trajectory planning for autonomous robotic industrial excavator. In 2020 *IEEE/RSJ International Conference on Intelligent Robots and Systems (IROS)*, pages 2656-2662. IEEE, 2020, which is incorporated by reference herein in its entirety) proposed an excavation trajectory planning framework for industrial autonomous robotic excavators, which emulates the strategies of human operators to optimize the excavation of different types of soils while also upholding robustness and safety in practice.

Despite these advances, there is less research focusing on the planning architecture that connects the high-level task planner, sub-task planners, and motion planning for autonomous machinery, such as excavators. Elezaby et al. (Ahmed Adel Elezaby, Mohamed Abdelaziz, and Sabri Cetinkunt. Operator model for construction equipment. In 2008 *IEEE/ASME International Conference on Mechtronic and Embedded Systems and Applications*, pages 582-585. IEEE, 2008, which is incorporated by reference herein in its entirety) presented an event-based finite-state machine strategy model, which selected different motion primitives for the wheel loader task cycle. While it may provide a promising system architecture design, the motion primitive definition is based specifically on a wheel loader and does not generalize very well (i.e., does not fit the excavator very well). Furthermore, no related sub-task definition exists in the published work and within which the architecture of the task planner is general. Most research mentioned above mostly focuses either on the high-level task planning, or the motion primitive's design. Overall, there is no from-top-to-bottom planning system architecture design for autonomous machinery like excavators.

To address these limitations, in this patent document, embodiments of a novel hierarchical planning architecture for autonomous machinery systems are presented. It shall be noted that, for purposes of illustration, application to excavators is presented, but aspects of embodiments may be generally applied to other autonomous machinery.

In one or more embodiments, the issue of the vast variety of excavation task types is first handled, and embodiments of a high-level task planner for excavation task division and base move planning were designed. Then, two types of sub-task planners are abstracted out with good portability and generality, including material removal sub-task planner, and base move sub-task planner. Next, embodiments encapsulate the motion primitives and furnish them with suitable controllers for both joints control and base control. Finally, embodiments were implemented and are further validated in both real-world experiments and dynamic simulation environments with a range of excavators. The results show that the system architecture embodiments and planner method embodiments are able to generate effective work plans that may be fed into the autonomous excavation system in a general way.

This patent document is organized as follows. In Section B, embodiments of a novel general planning system architecture are presented. In Section C, embodiments of a high-level task planner are presented in terms of excavation task division and base move planning. A definition of the local task region is first given. Then, three common tasks and their planning schemes are introduced in detail. Section D focuses on the implementations of sub-task planners, which include both arm movement and base movement. Their related motion primitives are covered there as well. Both real-world experimental results and simulation results are presented in Section E. In Section F, some conclusions or observations are drawn. In Section G, some computing system embodiments are presented.

B. Planner Architecture Embodiments

Figure 2:
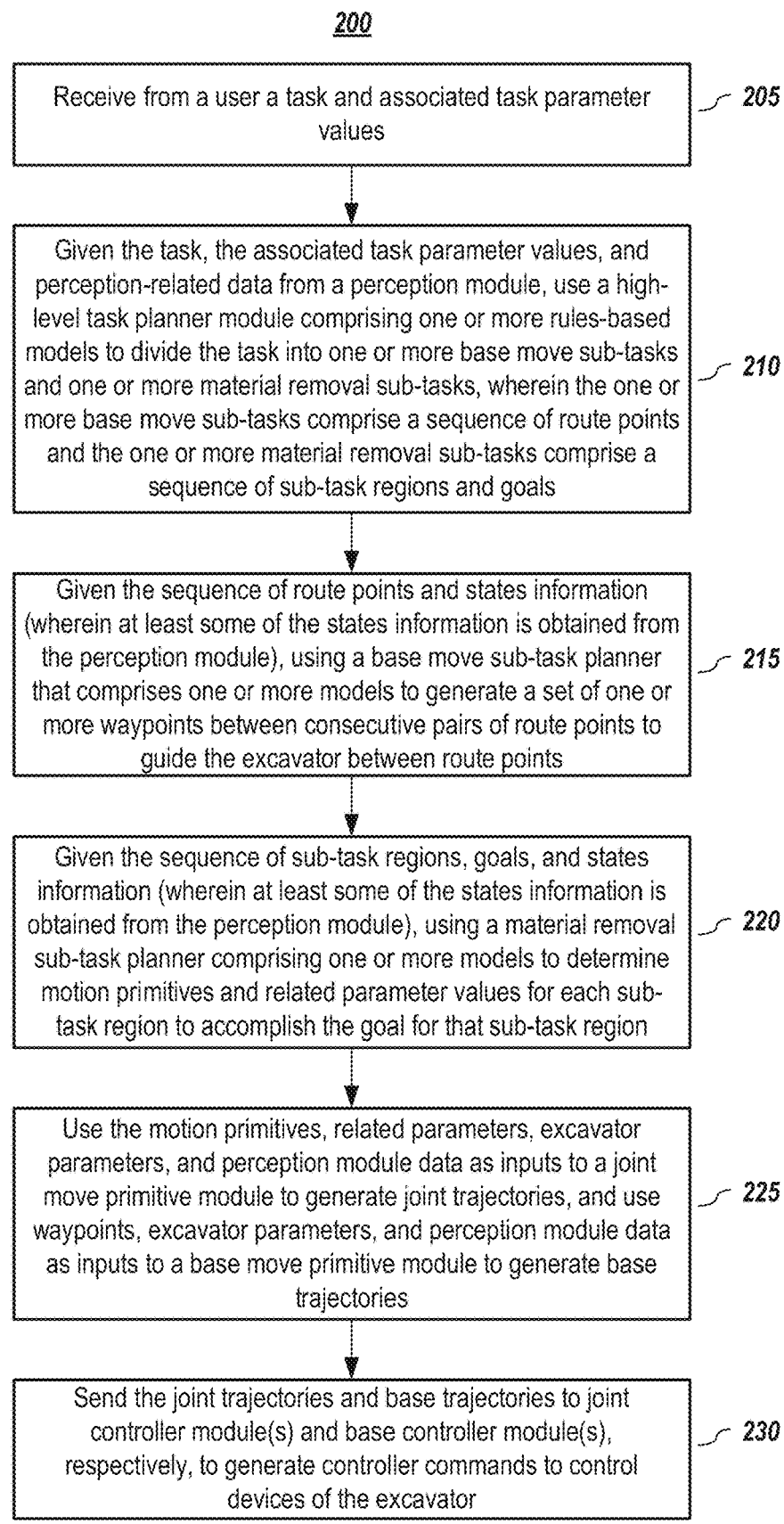
FIG. 2 depicts an example methodology using the planner system 100, according to embodiments of the present disclosure.

Presented herein are embodiments of a hierarchical planner architecture regarding the general applications. FIG. 1 depicts an example overall architecture of a planner 110 for an excavator, according to embodiments of the present disclosure. Note that the main components are drawn inside the dashed box. FIG. 2 depicts an example methodology using the planner system 100, according to embodiments of the present disclosure.

In the depicted architecture, there are two levels of task planners plus one level of motion primitives. From top to bottom, they are high-level task planner layer or module 120, sub-task planner(s) layer (e.g., material removal sub-task region planner 135 and base move sub-task planner 140), and motion primitive(s) layer (e.g., joint controller 175 and base controller 180). In most scenarios, the excavator alternates between the motion of its arm to perform excavation operation and the moving of the base to the desired position. Based on this characteristic, in one or more embodiments, the planner may separate the material removing and base moving into two planning pipelines.

Figure 3:
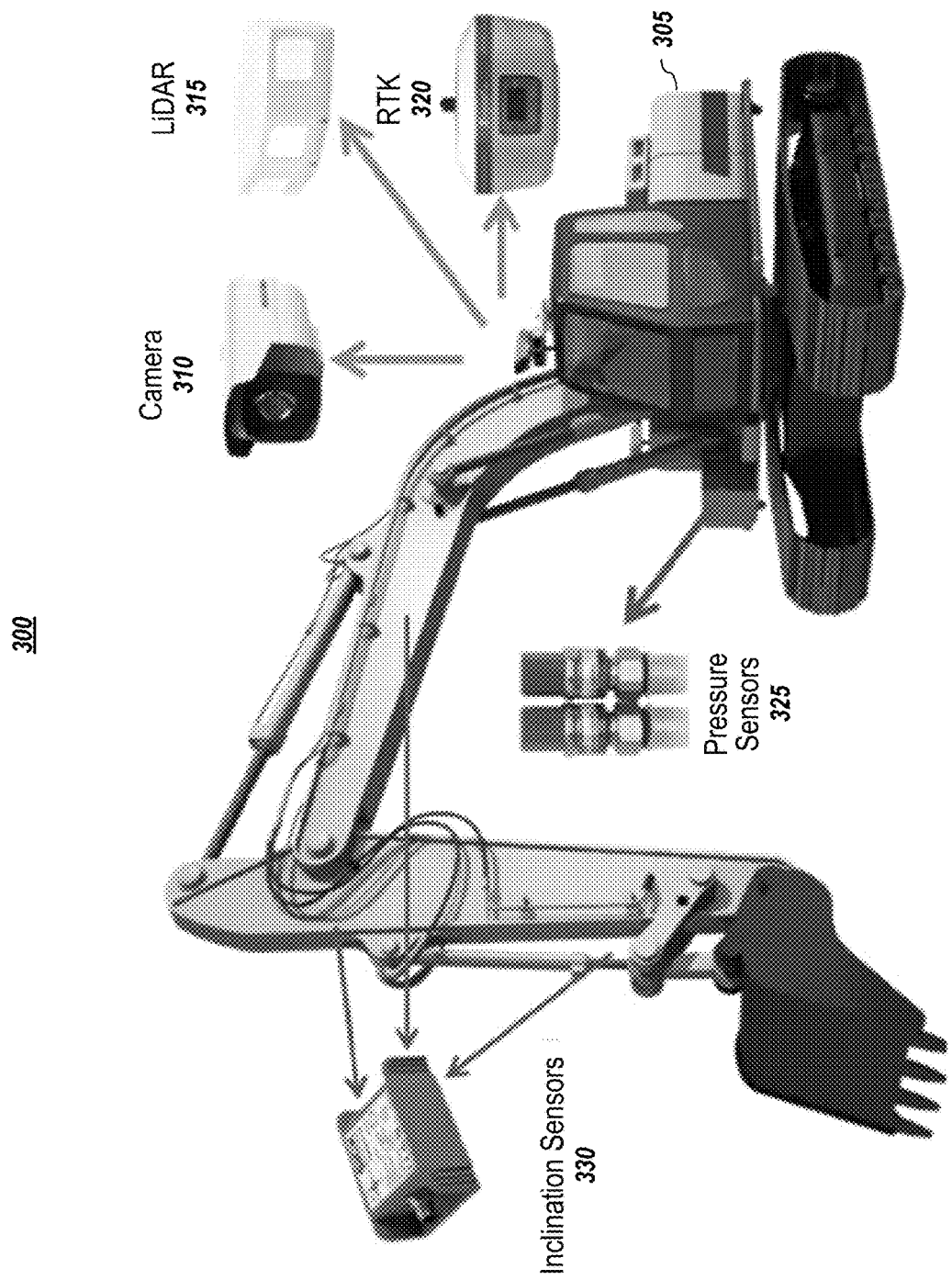
FIG. 3 depicts sensor components of an excavator that may be supplied via a perception module or modules to a planner, according to embodiments of the present disclosure.

To aid in real-time determination of planning and primitive, the various layer may receive input from one or more perceptions modules 185, which may comprise raw sensor data or processed sensor data. In one or more embodiments, one or more rule-based and/or machine learning-based models may be used to pre-process/process sensor data before providing it to components of the planner 110. By way of illustration only, FIG. 3 depicts some examples of sensors that may be used in conjunction with a planner 110 for use with an excavator. As depicted, an autonomous machine, like an excavator 305, may be equipped with sensors, which may include one or more cameras 310, a LiDAR sensor 315 (which provides LiDAR point cloud data), a Real-Time Kinematics (RTK) 320 (which provides high-accuracy/high-precision differential positioning, which may also use signals from Global Position System (GPS)/Global Navigation Satellite Systems (GNSS)), one or more pressure sensors 325, and one or more inclination sensors 330.

In one or more embodiments, there exist a variety of user-defined (or tasks that a user may define) that a user may select via a user interface 105. By allowing users to define tasks, embodiments allow the high-level task planner to be highly customized.

In one or more embodiments, two types of sub-tasks are defined, although it shall be noted for different machinery or different applications, there may be more or fewer sub-tasks. In one or more embodiments, the high-level task planner embodiments, being closest to the user interface 105, take (205) the user task as input and then divide the task into these types of sub-tasks, namely material removal sub-tasks and base move sub-tasks. In one or more embodiments, the user may also input (or it may be previously loaded) one or more associated task parameter values, such as size and position of a trench to be dug or location and depth of removal of a pile of dirt. In one or more embodiments, the planner embodiments play a role of determining which location the excavator should move to and which region of material the excavator should dig. In one or more embodiments, for each excavation task, the high-level planner determines (210) a sequence of excavator route points, and at each excavator route point, a sequence of digging regions (sub-task regions) is determined (210). Once all sub-tasks are done by following the generated sequence, the task assigned by the user may be considered finished. In one or more embodiments, for the arm movements task, a high-level task planner embodiment assumes the excavator base is stationary, and it calculates the sub-task region (the material region) that can be reached by the excavator's arm at that fixed position. For the base movements task, the planner embodiment may require the excavator to reach the desired route point with a given heading angle.

In one or more embodiments, given this high-level task planner and its result of sub-tasks, sub-task planner or planners provide the solution to achieve the short-term goal. It guides the excavator to reach the target route point through waypoints planning. Meanwhile, it helps the excavator complete the sub-region excavation efficiently and accurately at a fixed base position. For simplicity, embodiments of the material removal sub-task planner may be referred to as MRSP, and embodiments of the base move sub-task planner may be referred to as BMSP. In one or more embodiments, MRSP receives sub-task region from high-level task planner and decides (220) the motion primitive and calculates the relevant parameters. In one or more embodiments, BMSP receives the excavator route points from the high-level task planner, and outputs (215) the waypoints between two route points and the relevant constraints.

The motion primitives may be abstracted as the result of sub-task planner, instead of direct motion control, mainly because there are many repeated and modular operation actions in excavation job, which simplifies the complexity of sub-task planners. Currently, embodiments include dig motion primitive, dump motion primitive, and base move motion primitive—although it shall be noted that there may be different and/or additional primitives, particularly for different types of equipment. Besides the task planning results, these primitives may use several external excavation parameters, such as from the perception module 185 and parameter values associated with the excavator, to generate (225) the feasible trajectories (e.g., joint trajectories 165 and base trajectories 170). Examples of the excavation parameters may include the length of each excavator link, bucket volume, material remove sub-task region size, desired dig depth, and bucket teeth position constraints. In one or more embodiments, the generated trajectories may be the output of the entire planning system, but the input for the controllers (e.g., joint controller 175 and base controller 180) to follow. The controllers may use the trajectories to generate controller commands to control devices (e.g., motors, hydraulics, etc.) of the excavator.

In summary, an embodiment of the high-level task planner calculates the global stop route points, local task regions, and local task goals of each stop station. And, in one or more embodiments, sub-task planners MRSP and BMSP handle these sub-tasks by calling the encapsulated motion modules, which are the motion primitives designed herein. In one or more embodiments, the motion primitives finally generate the trajectories for controllers.

As noted previously, while some embodiments are provided in the context of an excavator, it shall be noted that the general architecture and methodology may be applied to other context. For example, in one or more embodiments, a general planning method may comprise receiving, as an input, a task for an autonomous machine to perform and a set of parameters related to the task. A set of sub-task configurations for the task may be generated using the high-level planner that comprises one or more models for the task and that uses at least one of the parameters from the set of parameters related to the task and one or more parameters related to the autonomous machine to generate the set of sub-task configurations, wherein the set of sub-task configurations have an order and wherein each sub-task configuration may have an associated type. In one or more embodiments, for each sub-task configuration, primitive parameter values are generated using a sub-task planner corresponding to the associated type for that sub-task configuration, in which the sub-task planner uses the sub-task configuration from the high-level planner, states information (which may be obtained from one or more sensors or perception modules), and one or more sub-task models. In one or more embodiments, for a primitive, control reference data may be generated using a primitive model, one or more primitive parameters from the sub-task planner that corresponds to the primitive, and one or more sensor inputs corresponding to the primitive. Finally, in one or more embodiments, the control reference data may be used to control one or more components of the autonomous machine.

C. High-Level Task Planner Embodiments

In one or more embodiments, the high-level task planner takes the user-defined task as input and divides the task for the sub-task planners. Thus, in this section, this division is covered in terms of local task region. Also, for better understanding the use of high-level task planner embodiments, three common tasks in real constructions were developed, which are a trench task, a pile removal task, and a large-scale pile removal task, and are provided by way of illustration only.

Here, two different types of excavation task based on the moving direction and the requirement of the material residue are defined: forward-movement tasks and backward-movement tasks. For forward-movement tasks, the target material is above the surface ground, which means that the goal height of the material removal is the same as that of the surface ground. After the material in front of the excavator is removed, the excavator may then move forward to continue. On the other hand, for backward-movement tasks, the goal height of material is below surface ground, after closer materials are removed, the excavator typically moves backward to continue. Thus, the trench task is a backward-movement task, while pile removal and large-scale pile removal are forward-movement tasks.

For a given excavator kinematic model, the local safely reachable range is pre-determined. The maximum reachable distance may be denoted as $r_{max}$, the minimum reachable distance may be denoted as $r_{min}$. To fully cover the global task zone, in one or more embodiments, a local task region overlap area, denoted as $r_o$, is set.

While specific example tasks are provided below for the excavator example, it can be seen that, based upon the task and parameter values associated with the task (e.g., size of trench, parameter values of the excavator that define its local region, etc.) the high-level planner generates uses its task models to divide the task into one or more base move sub-tasks and one or more material removal sub-tasks, wherein the one or more base move sub-tasks comprise a sequence of route points and the one or more material removal sub-tasks comprise a sequence of sub-task regions and goals (e.g., dig to depth d).

1. Local Task Region Embodiments

Before introducing the three specified common tasks, this section provides a definition of the local task region for MRSP. The task region of MRSP may be defined locally in the excavator's base coordinate frame. The local task region may be defined using four parameters: 1) area center swing angle α; 2) area angle range or width (β; 3) near end distance $r_{min}$; and 4) remote end distance $r_{max}$. Two types of local task region are provided. A high-level task planner embodiment may select sector area or rectangle area as local task region. Thus, the parameter β has two definitions. Angle range definition corresponds to sector area, while width definition corresponds to rectangle area. FIG. 4 depicts the two local task region definitions using the parameters, according to embodiments of the present disclosure.

There are two points to note about the local task region. First, the selection of $r_{min}$ and $r_{max}$ should be based on excavator size to make sure the local task region is reachable by the bucket. Second, during the dig and dump loop, the excavator base pose may have a small change compared to the initial base pose. If the local task region is not updated, the global task zone in the map coordinate frame will change. To solve this problem, in one or more embodiments, the MRSP records the task region center in the map coordinate frame initially. Before each dig-dump loop, the MRSP may check the current excavator base pose in the map coordinate frame using data from the perception module and may adjust the local task region parameters to ensure the local task region does not shift in the global task zone.

2. Trench Task Embodiments

Suppose the desired trench has a length of l, and width of w. The initial route point of the excavator is located along the trench direction, $r_{max}$ meters from the trench beginning. After each sub-task finishes, the excavator base moves backward for the next sub-task. The backward distance may be defined as $d=r_{max}-r_{min}-r_o$. The total number n of material remove sub-task execution is n=[l/d]. To meet the trench length requirement, the near end boundary distance of the last sub-task may be defined as $r_{min}+n\cdot d-l$.

Figure 5:
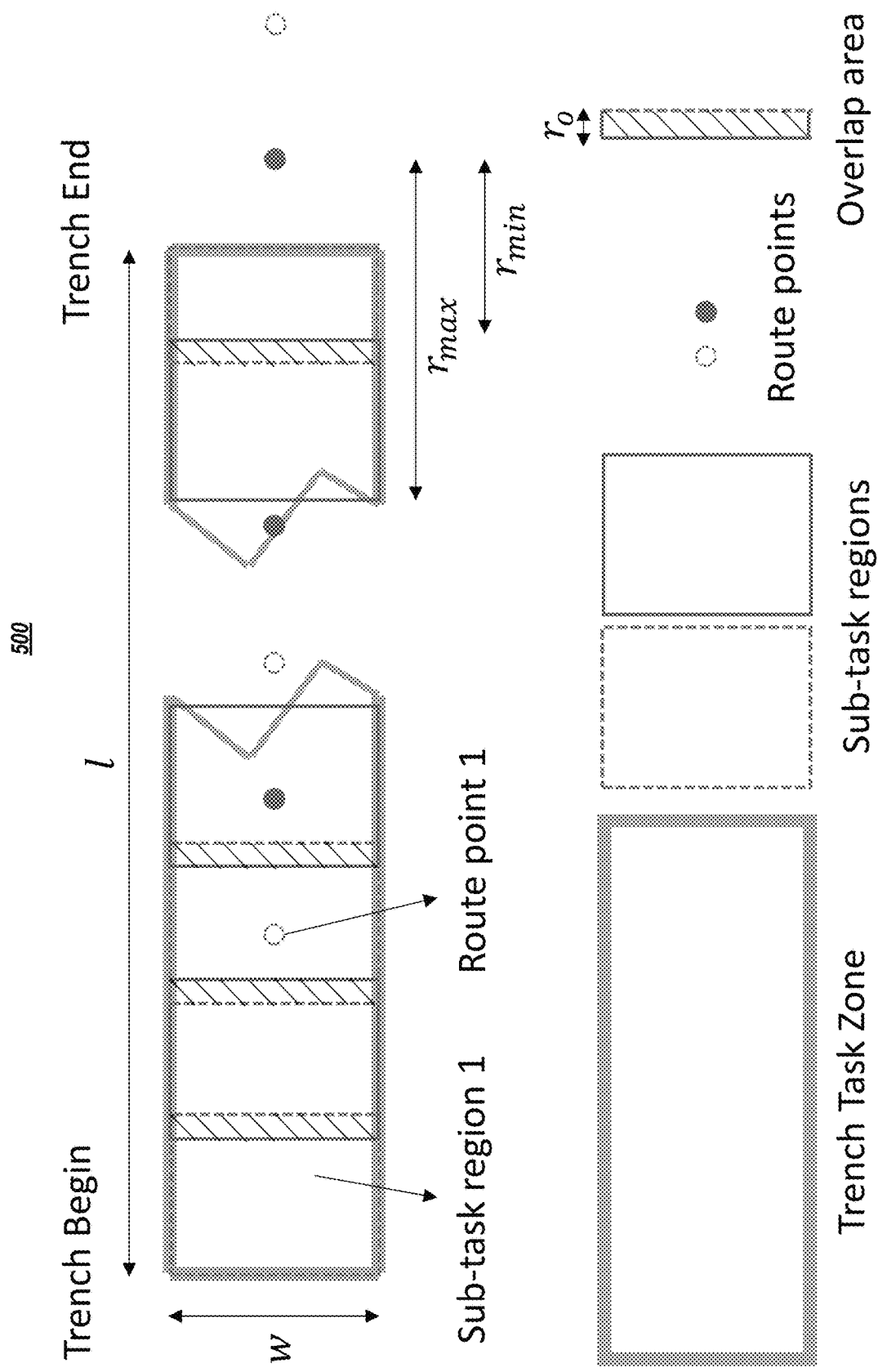
FIG. 5 depicts an example of trench task high-level planning, according to embodiments of the present disclosure.

In general, the desired trench width w is relatively narrow. Rectangle was chosen as the sub-task region shape. FIG. 5 shows the high-level planning for trench tasks, according to embodiments of the present disclosure. The top portion of FIG. 5 represents high-level planning for trench tasks and the bottom portion represents a legend.

3. Pile Remove Task Embodiments

Pile removal task and trench task share similar definitions and have the same notations to describe the planner. A difference is the trench task is a backward-movement task, while the pile removal task is a forward-movement task. Similar to the trench task, suppose the desired pile to remove has a length of l and width of w. The initial route point of the excavator is located along the pile length direction, $r_{max}$ meters back from the pile task zone beginning. In one or more embodiments, after each sub-task finishes, the excavator base moves forward for the next sub-task. The backward distance $d=r_{max}-r_{min}-r_o$. The total number n of material remove sub-task execution is n=[l/d]. To meet the pile length requirement, the remote end boundary distance of the last sub-task is $r_{min}+l-(n-1)\cdot d$.

Figure 6:
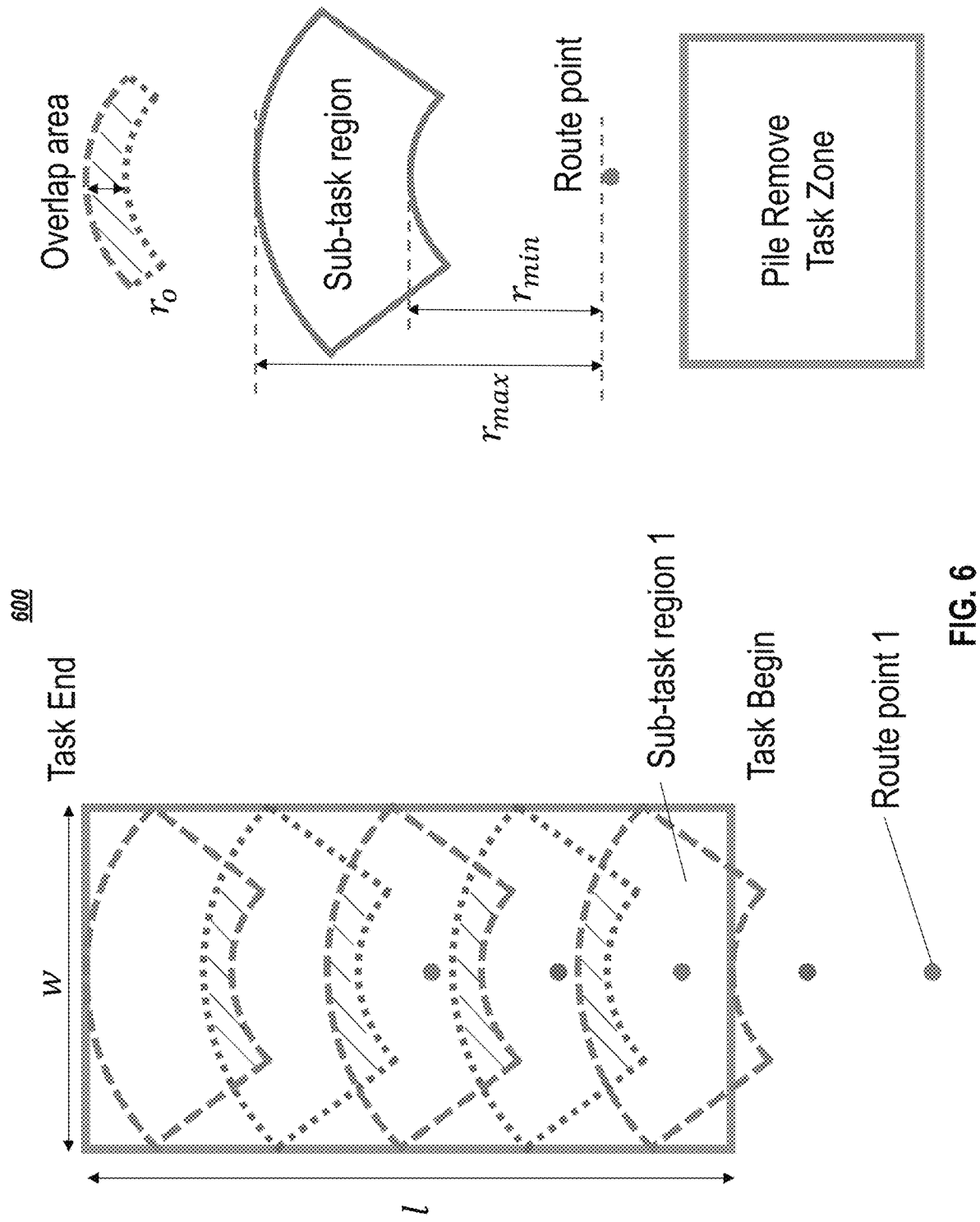
FIG. 6 depicts an example of pile removal task high-level planning, according to embodiments of the present disclosure.

Pile task zone has a relatively wide width w. Sector was chosen as the sub-task region shape. If the rectangle task region is applied, the top left corner or top right corner may not reachable for the excavator. FIG. 6 shows a high-level planning for pile removal tasks, according to embodiments of the present disclosure. The left portion of FIG. 6 represents a high-level planning for pile removal tasks, and the right portion represents a legend.

4. Large-Scale Pile Remove Task Embodiments

The task zone definition of the large-scale pile removal task is similar to the one of the pile removal task. However, the task zone area may be larger than the pile removal task zone so that the excavator route path cannot be a straight line to finish the task. In one or more embodiments, the maximum width of the pile removal task may be denoted as q. If the width w of the task zone is larger than q, the task is a large-scale case. Otherwise, the task is considered as pile removal task, which is described in section C.3. In one or more embodiments, the following may be used:

$$q=2\sqrt{r_{max}^2-d^2} \quad (1)$$

Suppose the task zone width w is larger than q, in one or more embodiments, the task zone may be separated into m=[w/q] columns. For each column, a 180° sector may be used to cover a region. Consider the limitation of the LiDAR horizontal field of view in the real application, each 180° sector may be further decomposed into a smaller angle range of sectors. In one or more embodiments, the sectors close to each other have an overlap area to secure full coverage. In some applications where the material may be very thick, multi-layers may be used for sub-task division.

Figure 7:
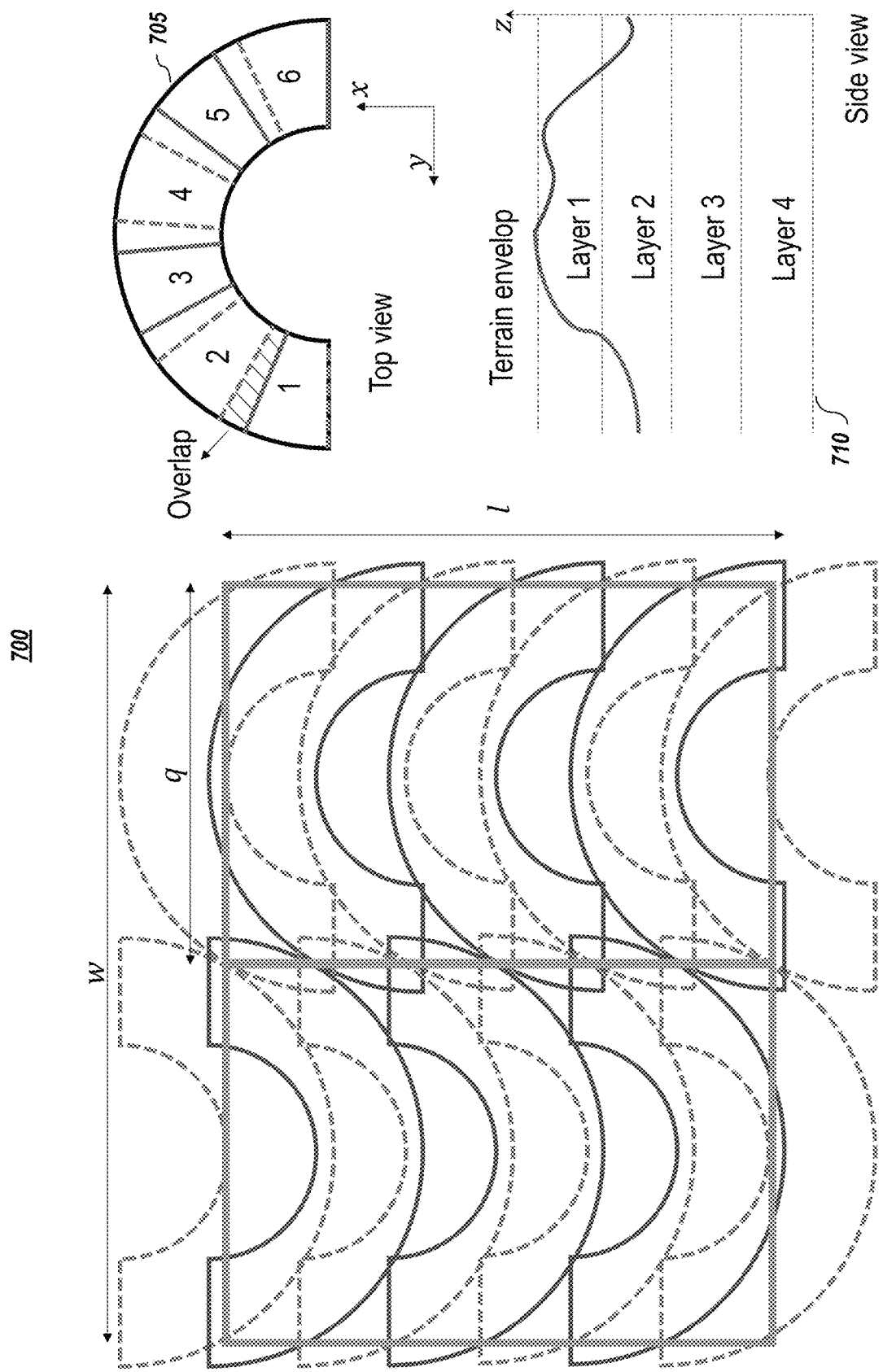
FIG. 7 depicts an example of large-scale pile remove sub-task regions decomposition, according to embodiments of the present disclosure.

FIG. 7 depicts an example of large-scale pile remove sub-task regions decomposition, according to embodiments of the present disclosure. At each route point, the 180° sector 705 may be decomposed into 6 parts, and 4 layers 710 may be used to cover the whole material—although it shall be noted that the number of parts and layers may be different. In one or more embodiments, the material-remove sub-tasks sequence of this route point is set to finish the first layer, and sub-region from part 1 to 6. Then, there is a move to the next layer until all of it is finished.

Figure 8:
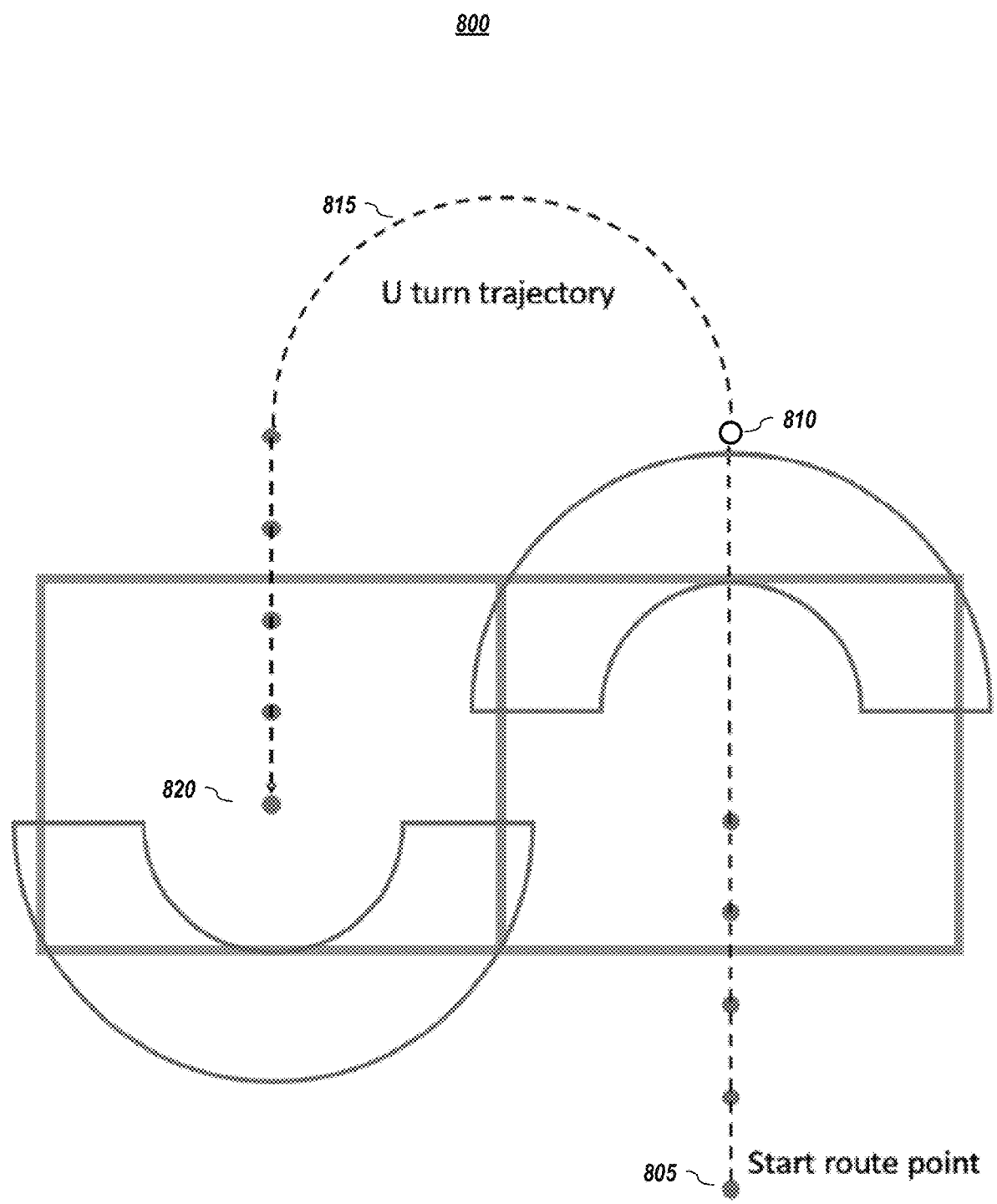
FIG. 8 depicts an example of large-scale pile remove sub-task base move planning, according to embodiments of the present disclosure.

In one or more embodiments, between two columns, the connection path may be designed using a semicircular arc. Since the excavator work area usually has soft ground surfaces, using a small turning radius may cause the excavator to sink into the ground. FIG. 8 shows an example excavator base path planning for the large-scale pile removal task, according to embodiments of the present disclosure. The initial route point 805 locates at the bottom right corner. The excavator moves straight to the top to finish the first column. Then, the excavator moves to the route point marked by the open circle 810, which represents the route point not associated with a material remove sub task. After that, the excavator follows the semicircular arc 815 as a U-turn to the second column. Finally, the excavator moves straight down to an end point 820 to finish the second column.

D. Sub-Task Planners and Motion Primitives Embodiments

As mentioned in Section B, embodiments may include two or more sub-tasks planners. In the illustrated embodiments, embodiments of the material removal sub-task planner plan dig materials to reach the desired amount and dump them into given positions, while embodiments of the base move sub-task planner navigate the excavator to reach desired position and heading angle. Accordingly, in following sub-sections, the design details of these sub-task planners are presented. After that, the motion primitives that these sub-task planners are based upon are presented.

1. Material Removal Sub-Task Planner Embodiments

In one or more embodiments, the input of MRSP may comprise two parts: (1) sub-task configuration from the high-level task planner; and (2) states information used for online/real-time planning. Sub-task configuration may include local task zone, target material height, and dump mode. Excavator states (such as excavator joint states and base pose) and environment states (e.g., LiDAR point cloud) may be used as states representations. In one or more embodiments, the output of the MRSP are the values for the motion parameters for the motion primitives.

Methodology 1 shows an embodiment of the procedures of the material-remove sub-task module. In one or more embodiments, MRSP first loads the sub-task configurations, which may comprise the sub-task region information, a sub-task goal, and a sub-task mode. Then, the MRSP uses a corresponding plan model to plan, in this case a dig-and-dump loop, until the material height in the local task zone reaches the target height. The dump position may be decided depending on the dump mode.

| Methodology 1: Material remove sub-task |
| --- |
| 1: procedure MRSP PROCEDURE |
| 2: set sub-task region. |
| 3: set sub-task goal. |
| 4: set soil dump mode. |
| 5: loop: |
| 6: if goal reach condition is met then |
| 7: end loop. |
| 8: else |
| 9: find point of attack. |
| 10: plan dig motion and perform. |
| 11: plan dump motion and perform. |
| 12: end procedure |

Figure 9:
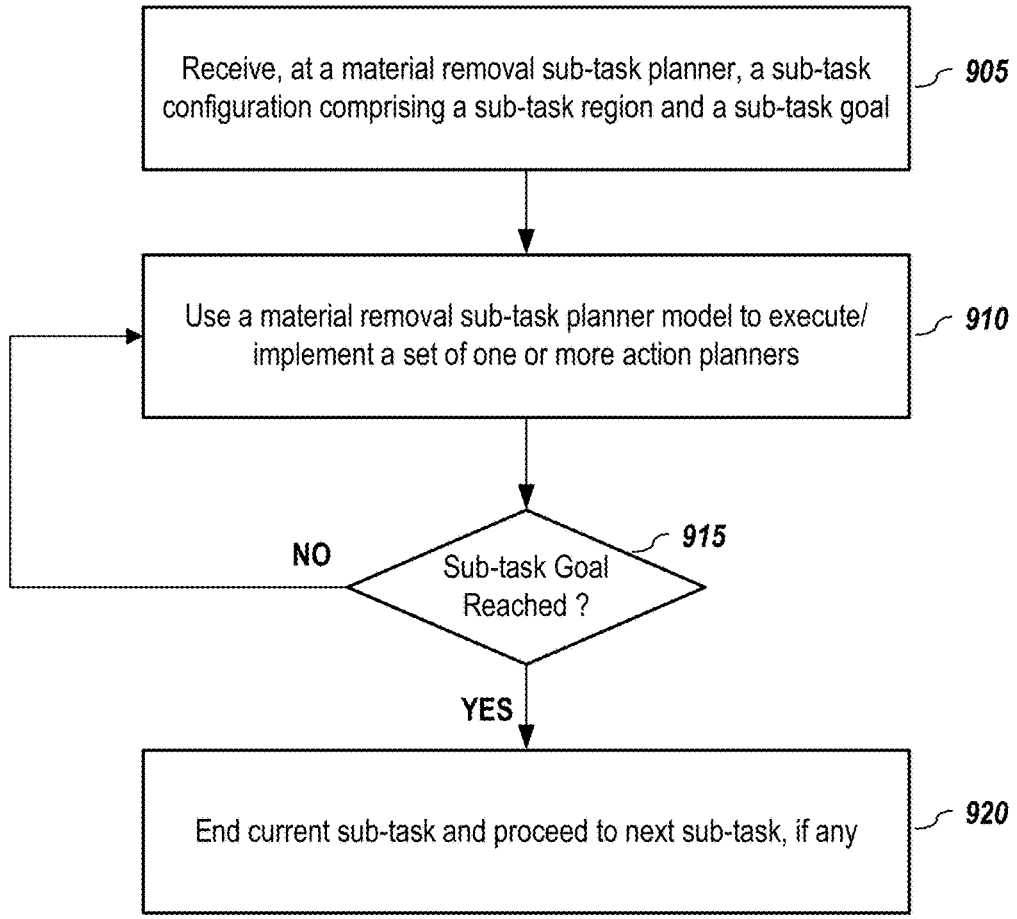
FIG. 9 depicts an alternative methodology for developing planning information, according to embodiments of the present disclosure

FIG. 9 depicts an alternative methodology for a MRSP embodiment for developing sub-task planning information, according to embodiments of the present disclosure. In one or more embodiments, the MRSP receives (905) a sub-task configuration, which may comprise a sub-task region and a sub-task goal, but may include additional information, which may be user-specified or sub-task specific. The MRSP may then use a material removal sub-task planner model to execute a set of one or more plan actions. For example, the model may comprise lines 6-12 in Methodology 1. The one or more plan actions may be performed until the sub-task goal is reached (915). In one or more embodiments, if the goal is reached, the current sub-task is considered complete and proceed to system may proceed to a next sub-task according an order from the high-level planner, which next sub-task may be of the same type or a different type.

a) Point of Attacking Planning Embodiments

Figure 10:
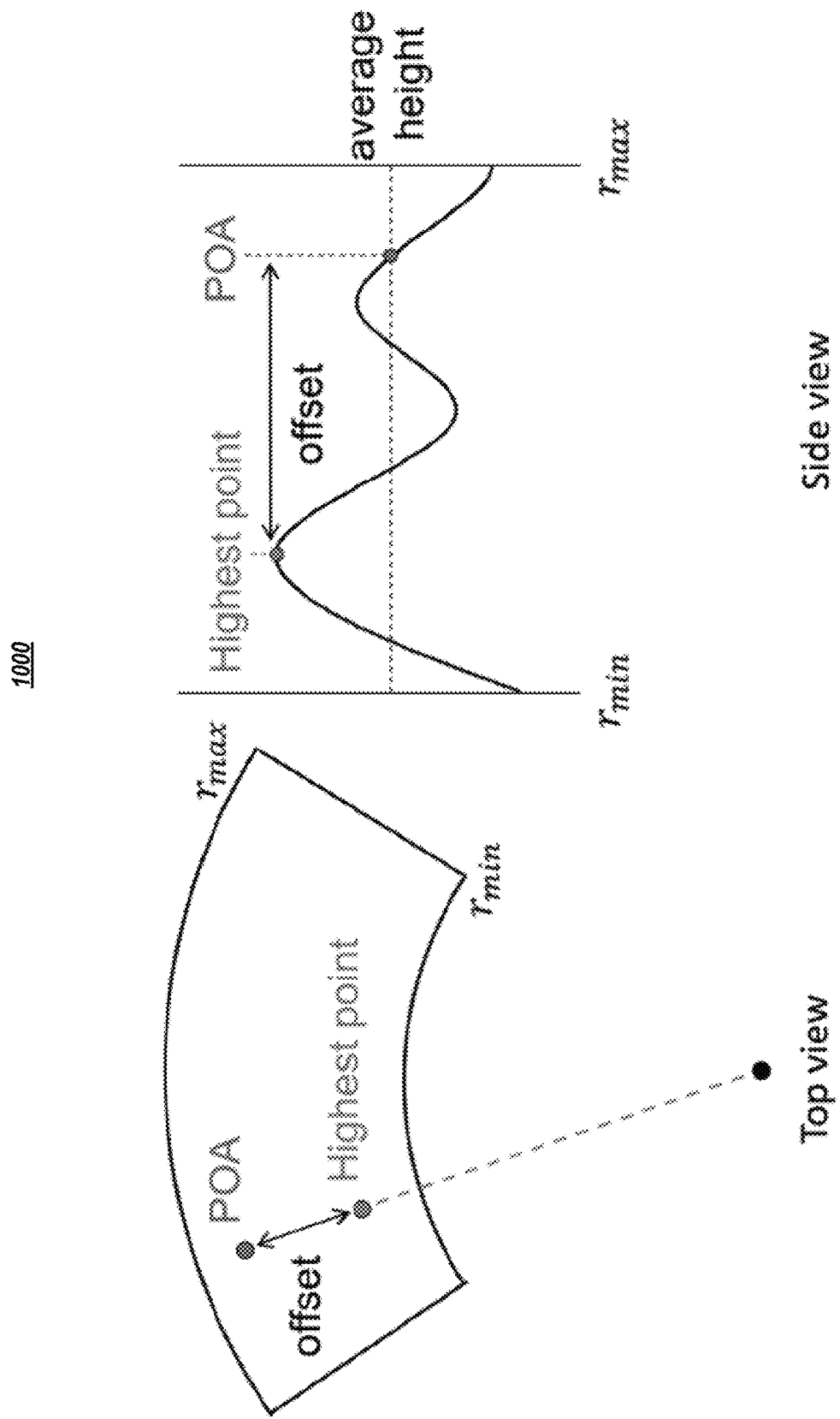
FIG. 10 depicts a method to determine point of attack (POA), according to embodiments of the present disclosure.

In one or more embodiments, MRSP finds the Point of Attack (POA) based on the LiDAR point clouds within the local task zone. In this approach, embodiments may determine POA based on the highest point with offset ahead. FIG. 10 shows a methodology to determine POA, according to embodiments of the present disclosure.

In one or more embodiments, MRSP first finds the highest point and average height of the local task zone. Then, starting from the base link origin, a straight line that connects the highest point is determined. As shown in the top view, a constant distance offset may be added to the line and the (x, y) of POA is determined. As shown in the side view, the z of POA may be set equal to the average height.

b) Dig Motion Parameters Embodiments

Figure 11:
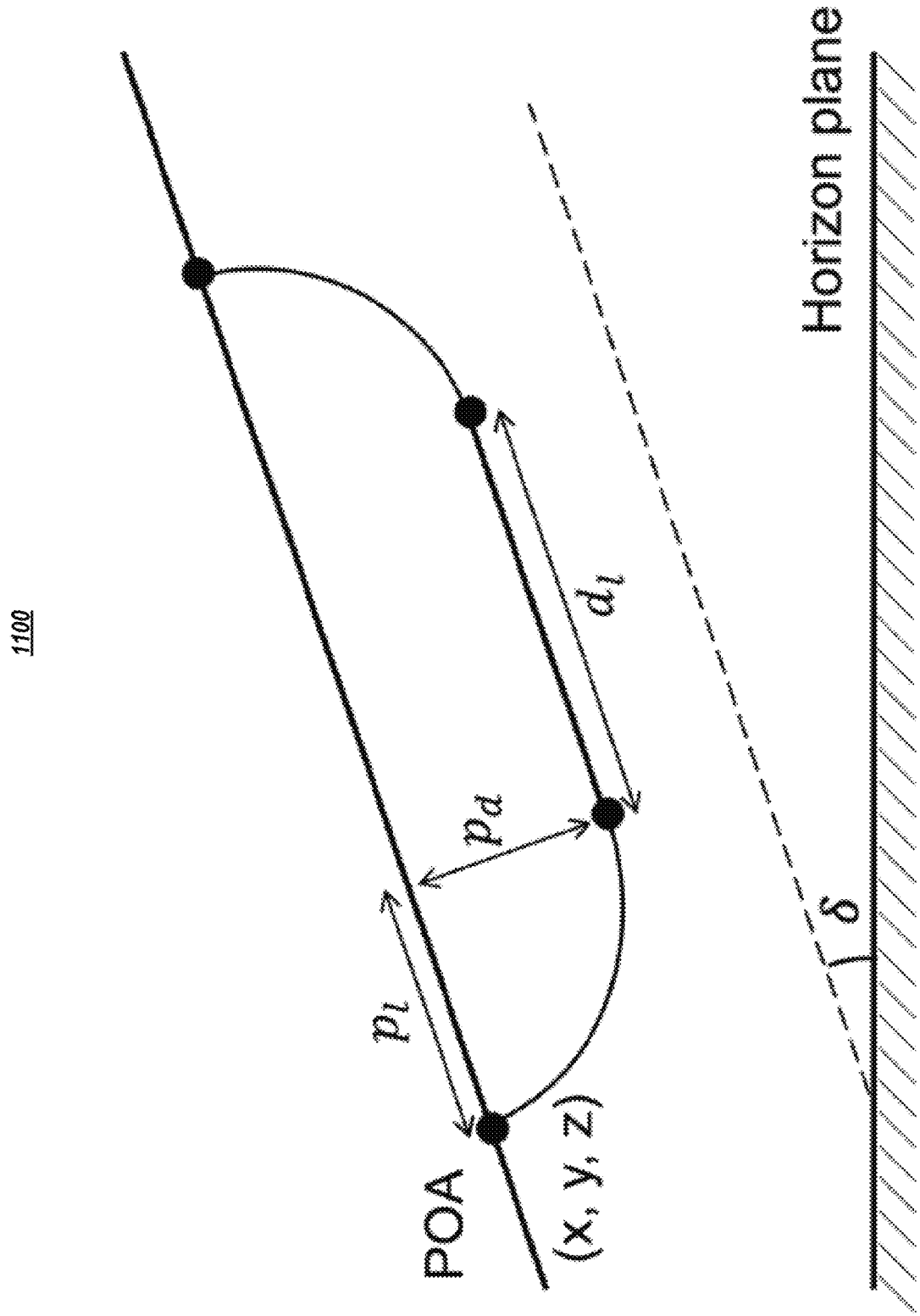
FIG. 11 depicts an example dig motion parameters definition, according to embodiments of the present disclosure.

In one or more embodiments, a dig motion planner first gets the POA for the bucket teeth end to contact. Then, the dig motion may be divided into three steps. First, the bucket penetrates into the material with some depth and distance closer to the base origin. Second, the bucket drags backward to the base origin to collect materials into the bucket. Lastly, the bucket closes until the bucket joint to teeth plane is flat, which prevents material leak in the following motion. Based on the discussion above, a dig motion may be defined by 7 parameters. In one or more embodiments, the dig motion parameters may be denoted as $D=[x_b, y_b, z_b, p_d, p_l, d_l, \delta]$ where $x_b$, $y_b$, $z_b$ represent the POA in base frame, $p_d$ represents penetration depth, $p_l$ represents penetration length, $d_l$ represents drag length, and $\delta$ represents entire dig motion tilt angle with respect to horizon plane. FIG. 11 shows an example dig motion parameters definition, according to embodiments of the present disclosure.

In one or more embodiments, these parameters may be determined according to the terrain shape, which may be obtained from the perception module, to optimize the material volume collected to match the bucket volume. The final dig motion trajectory may be further adjusted based on the excavator base pose to handle the case that the roll and pitch angle of the base is not zero.

c) Dump Modes Embodiments

In one or more embodiments, for universality, MRSP provides three different dump modes. The first mode uses a fixed dump point in the base frame of the excavator. The MRSP dumps to the same point every dig-dump cycles. The second mode uses a floating dump point in the base frame. This floating dump point is passed as the output of high-level task planner for the MRSP, which may be used in the dynamic working environment. The third mode is truck-dump mode. In this mode, the MRSP will subscribe the truck pose through perception module and calculate the appropriate dump point itself. In one or more embodiments, to make the truck loading of material evenly, MRSP finds the dump spot, where material height is low inside the truck bed, to dump.

d) End Condition Embodiments

As for end condition, MRSP may be designed to have three stopping conditions in favor of different task excavation strictness requirement, namely "rigid", "regular", and "loose".

The goal height may be denoted as g, the current highest point in the sub-task zone may be denoted as h, and the current average height of the sub-task zone may be denoted as a. For "rigid" mode, the finish triggering condition may be $h<g$. For "regular" mode, the triggering condition may be $a<g$ and $h<g+b$, where b is a positive value, which represents a height margin of the highest point. For "loose" mode, the finish triggering condition may be $a<g$.

2. Base Move Sub-Task Planner Embodiments

In one or more embodiments, the base-move sub-task planner navigates the excavator move to the target pose assigned by the high-level task planner. Similar to MRSP, the input of the base-move sub-task planner comprises both the target route point from high-level task planner and the states information used for online planning. The states information may include the excavator base pose and the LiDAR point cloud, while the outputs of the BMSP may be waypoints between consecutive route points (i.e., current route point and next route point) as well as relevant walking constraints.

BMSP embodiments were developed based on the 2D (two-dimensional) assumption. The 2-D target pose may be denoted as B=$[x_m, y_m, \Theta]$, where $(x_m, y_m)$ is the target position in the map frame, and $\Theta$ is the target heading angle in the map frame. However, it shall be noted that BMSP may readily be adapted or applied to 3D.

Figure 12:
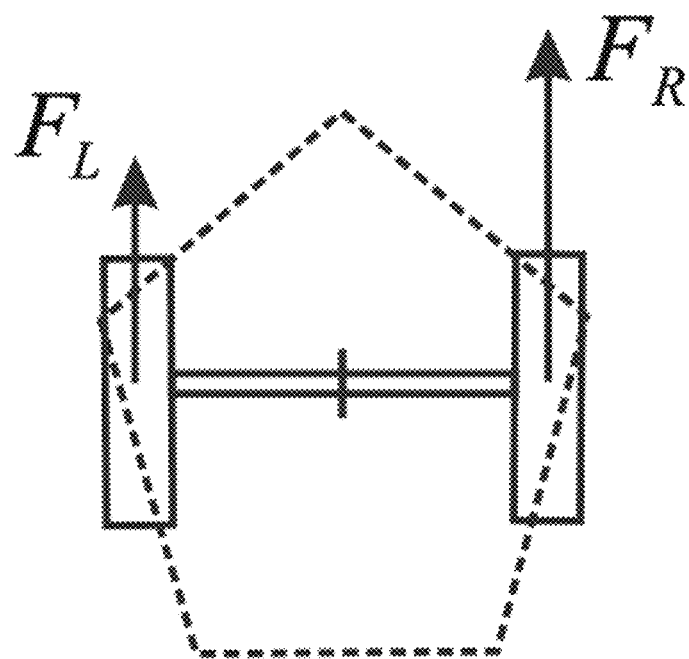
FIG. 12 graphically depicts an example unicycle model for an excavator, according to embodiments of the present disclosure.

As for global path planning, a path planner, such as Hybrid A* Path Planner methodology (Karl Kurzer. Path planning in unstructured environments: A Real-Time Hybrid A* Implementation For Fast And Deterministic Path Generation For The KTH Research Concept Vehicle. Master's Thesis, KTH, Integrated Transport Research Lab, ITRL, 2016, which is incorporated by reference herein in its entirety), may be applied in BMSP. With occupancy map generated by the LiDAR point cloud, current base pose, and target base pose, a smooth collision-free path of the waypoints may be generated. In one or more embodiments, a unicycle model, such as in Alessandro De Luca, Giuseppe Oriolo, and Marilena Vendittelli. Control Of Wheeled Mobile Robots: An Experimental Overview. *Ramsete*, pages 181-226, 2001 (which is incorporated by reference herein in its entirety), may be used as an excavator kinetic model for the MPC (model predictive control) controller. FIG. 12 graphically depicts an example unicycle model for an excavator, according to embodiments of the present disclosure.

3. Motion Primitives Embodiments

In one or more embodiments, motion primitives are encapsulated from the repeated excavator action, such as digging, dumping, and moving base. Therefore, the dig motion primitive, dump motion primitive, and base move motion primitive were designed for embodiments of the framework—although Joint move primitives, including digging and dumping, use the motion parameters or task configuration as described in Sections D.1.b and D.1.c, above. These joint move primitives calculate the joint trajectories for the proportional-integral-derivative (PID) controllers to follow and finally come up with the joint velocity control commands.

On the other hand, the base move primitive takes the path of waypoints generated by the BMSP as input. And the primitive acts as a MPC controller to generate the base control commands.

For low-level control, both velocity and base control commands may be matched to current inputs of the hydraulic system of excavator using a look-up table.

E. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

Trench task and pile removal task were performed in a real excavator, and the large-scale pile removal task was performed in simulation. In the real test, the excavator used was a XCMG490DK, which has a max digging radius of 10.47 m, maximum digging height 10.12 m, maximum digging depth 6.93 m, and operating weight 36.6 ton. In the simulation, the excavator used was a CAT365CL, which has a max digging radius of 11.44 m, maximum digging height 11.90 m, maximum digging depth 7.17 m, and operating weight 67.0 ton. The AGX Dynamics was used as the simulation environment.

1. Trench Experiment

Figure 13:
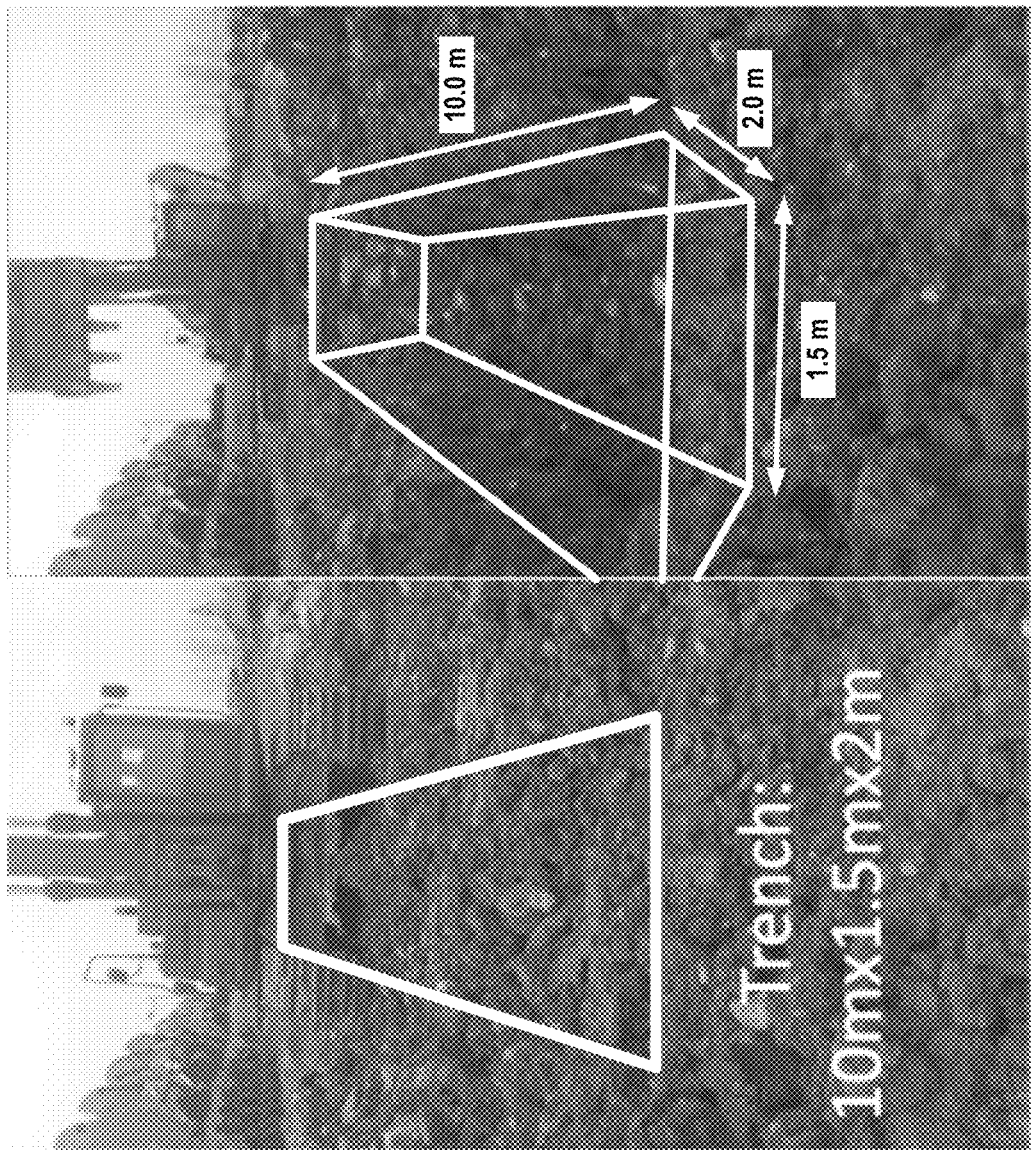
FIG. 13 depicts a trench experiment, according to embodiments of the present disclosure.

The target trench in experiment has a length of 10.0 m, width of 1.5 m, and depth of 2.0 m. Using an embodiment of the architecture and planner presented herein, the task finished using 20 minutes. Based on the trench size, the embodiment automatically set 5 route points and 5 material remove sub-tasks. FIG. 13 shows the on-site trench experiment, according to embodiments of the present disclosure. The image on the left is before the trench task started. The image on the right is after the trench task finished.

2. Pile Removal Experiment

Figure 14:
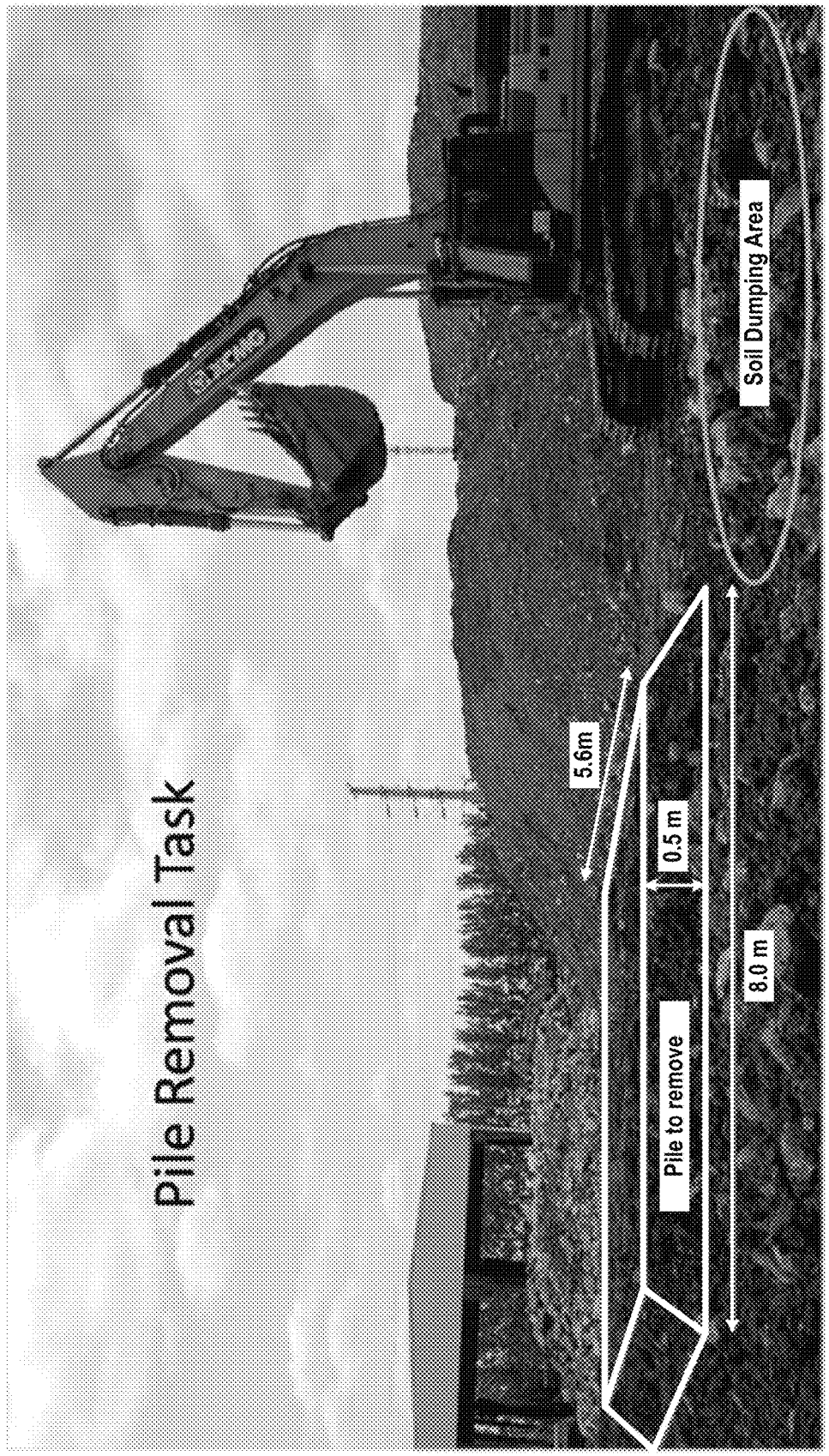
FIG. 14 depicts pile removal experiment setup, according to embodiments of the present disclosure.

The target pile had a length of 8.0 m, width of 5.6 m, and height of 0.5 m. Using a planner embodiment, the task was finished within 16 minutes. FIG. 14 shows the on-site pile removal experiment setup, according to embodiments of the present disclosure.

FIG. 15 shows 4 moments during the removal experiment setup, where the base located in different route points. Based on the pile size, the embodiment automatically set 4 route points and 4 material remove sub-tasks.

3. Large-Scale Pile Removal Experiment

Figure 16A:
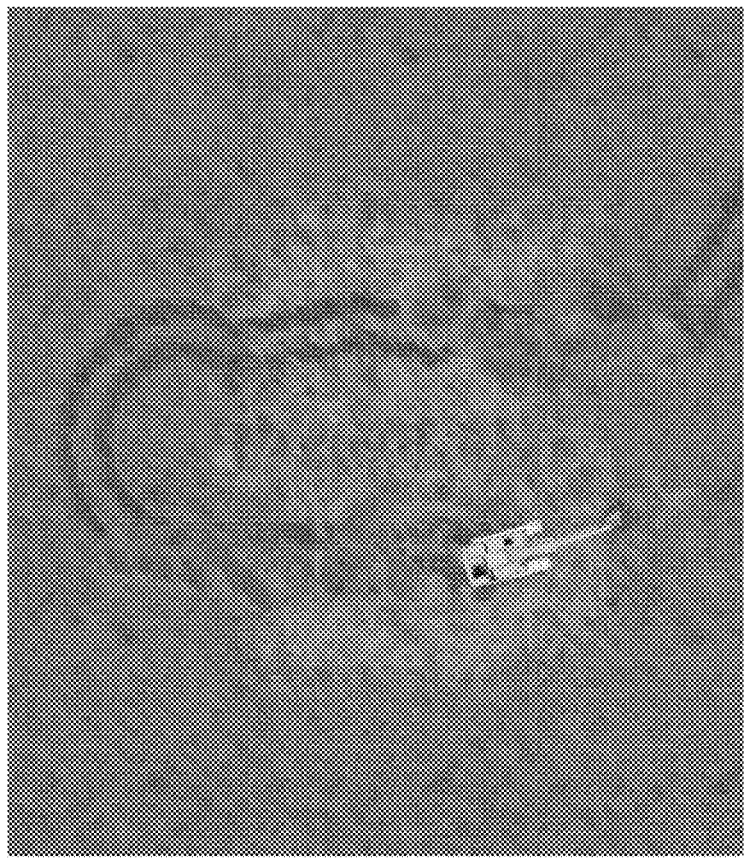

Large-scale pile removal experiment was performed in simulation. The target pile had a length of 36.0 m, width of 22.5 m, and height of 0.5 m. In the AGX simulator, the pile size was set to a length equal to 20.0 m, width equal to 12.0 m, and the height remained 0.5 m. FIGS. 16A&B show the simulation results, according to embodiments of the present disclosure. The images on the left (1605 and 1615) show the initial simulation configuration, and the images on the right (1610 and 1620) show the environment when the simulation finished.

Initially, the excavator was located at the bottom right of the environment. It first moved to the first planned route point and started manipulation for the first column. Once the first column was finished, it performed a U-turn and then worked on the second column. In the RVIZ view (FIG. 16B), the outer box shows the task zone assigned by a user, the inner box shows the actual pile generated in the AGX simulator. The white marker points represent the route point without material-remove sub-task assigned, and darker marker points represent the route point with material remove sub-task assigned. The color shown in RVIZ is based on soil height. In the initial configuration, the color inside the inner box is very different from the color outside. When the task finishes, the color is uniform which means the task is well done. Since the soil is dumped on the ground directly, there are some small piles locates on the excavator base move trajectory.

F. Some Conclusions or Observations

This patent document presents embodiments of a novel autonomous excavator planning system design. In one or more embodiments, high-level task planning includes task division and base movement planning. Embodiments of general sub-task planners designed with motion primitives, which take both arm and base movement into consideration, were also presented herein. Based on the experiment results, using an embodiment of the material-remove sub-task planner and base-move sub-task planner, embodiments of the general autonomous excavator planning system architecture are able to fit different excavation tasks.

Besides excavation tasks, excavators have also been used for tasks such as surfacing the ground and other tasks. It shall be noted that architecture embodiments may be readily extended to other, new types of tasks. Also, out base move planning is to 2D; however, in some working environments, the excavator may drive on a rugged terrain surface. Thus, one skilled in the art shall recognize that embodiments may be readily extended to 3D base move planning with consideration of excavator balancing.

G. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 17:
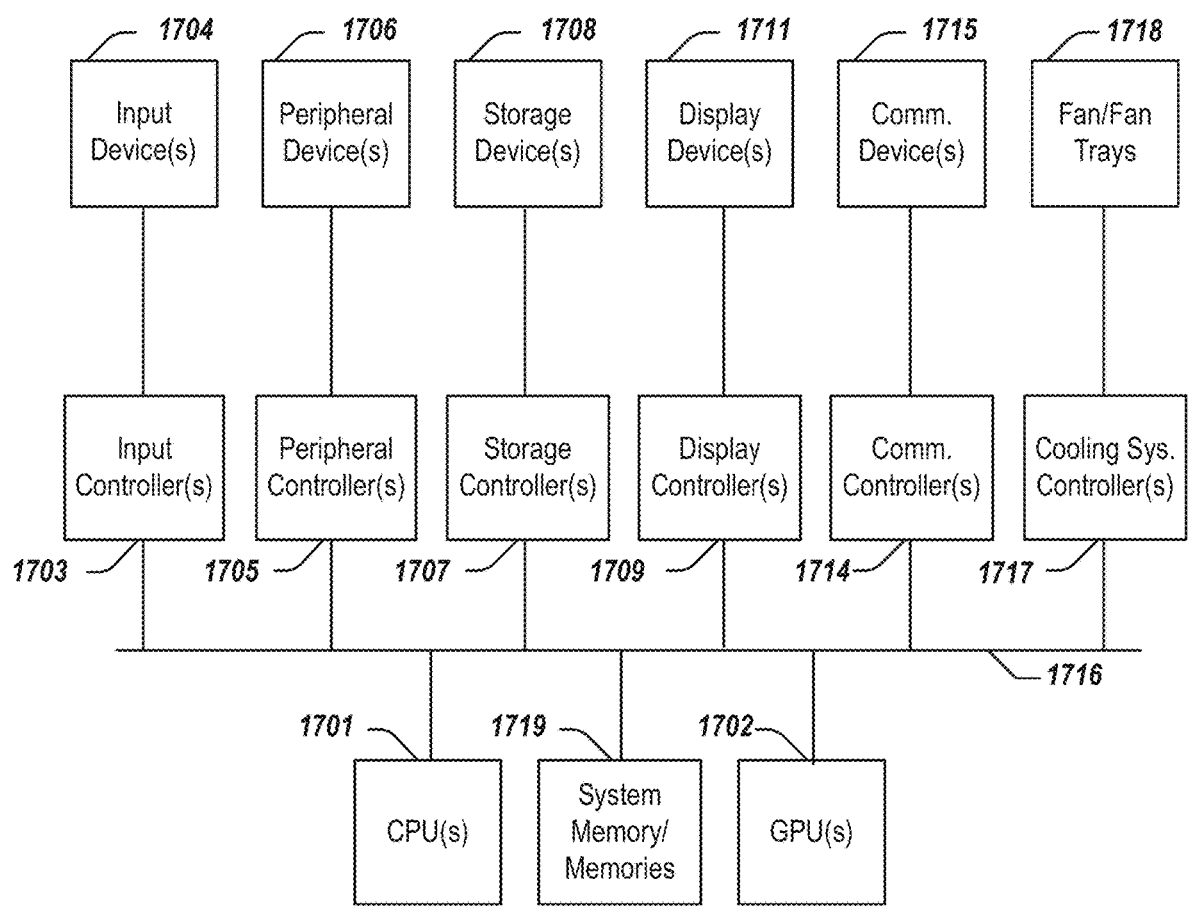
FIG. 17 depicts a simplified block diagram of a computing device/information handling system, according to embodiments of the present disclosure.

FIG. 17 depicts a simplified block diagram of an information handling system (or computing system), according to embodiments of the present disclosure. It will be understood that the functionalities shown for system 1700 may operate to support various embodiments of a computing system—although it shall be understood that a computing system may be differently configured and include different components, including having fewer or more components as depicted in FIG. 17.

As illustrated in FIG. 17, the computing system 1700 includes one or more CPUs 1701 that provides computing resources and controls the computer. CPU 1701 may be implemented with a microprocessor or the like, and may also include one or more graphics processing units (GPU) 1702 and/or a floating-point coprocessor for mathematical computations. In one or more embodiments, one or more GPUs 1702 may be incorporated within the display controller 1709, such as part of a graphics card or cards. Thy system 1700 may also include a system memory 1719, which may comprise RAM, ROM, or both.

A number of controllers and peripheral devices may also be provided, as shown in FIG. 17. An input controller 1703 represents an interface to various input device(s) 1704. The computing system 1700 may also include a storage controller 1707 for interfacing with one or more storage devices 1708 each of which includes a storage medium such as magnetic tape or disk, or an optical medium that might be used to record programs of instructions for operating systems, utilities, and applications, which may include embodiments of programs that implement various aspects of the present disclosure. Storage device(s) 1708 may also be used to store processed data or data to be processed in accordance with the disclosure. The system 1700 may also include a display controller 1709 for providing an interface to a display device 1711, which may be a cathode ray tube (CRT) display, a thin film transistor (TFT) display, organic light-emitting diode, electroluminescent panel, plasma panel, or any other type of display. The computing system 1700 may also include one or more peripheral controllers or interfaces 1705 for one or more peripherals 1706. Examples of peripherals may include one or more printers, scanners, input devices, output devices, sensors, and the like. A communications controller 1714 may interface with one or more communication devices 1715, which enables the system 1700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1700 comprises one or more fans or fan trays 1718 and a cooling subsystem controller or controllers 1717 that monitors thermal temperature(s) of the system 1700 (or components thereof) and operates the fans/fan trays 1718 to help regulate the temperature.

In the illustrated system, all major system components may connect to a bus 1716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
   receiving, from a user, a task for an excavator and associated task parameter values;
   given the task, the associated task parameter values, at least some of perception-related data received from a perception module, using a high-level task planner module comprising one or more rules-based models to divide the task into one or more base move sub-tasks and one or more material removal sub-tasks, wherein the one or more base move sub-tasks comprise a sequence of route points and the one or more material removal sub-tasks comprise a sequence of sub-task regions and a goal for each sub-task region;
   given the sequence of route points and states information wherein at least some of the states information is obtained from the perception module, using a base move sub-task planner that comprises one or more models to generate a set of one or more waypoints between consecutive pairs of route points to guide the excavator between route points;
   given the sequence of sub-task regions, associated goals, and states information wherein at least some of the states information is obtained from the perception module, using a material removal sub-task planner comprising one or more planner models to determine motion primitives and related parameter values for each sub-task region to accomplish the goal for that sub-task region;
   using the motion primitives, related parameters, excavator parameters, and perception module data as inputs to a joint move primitive module to generate joint trajectories and using waypoints, excavator parameters, and perception module data as inputs to a base move primitive module to generate base trajectories; and
   providing the joint trajectories and base trajectories to joint controller module(s) and base controller module (s), respectively, to generate controller commands to control devices of the excavator.

2. The computer-implemented method of claim 1 wherein the perception module comprises or receives data from one or more sensors comprising:
   a camera for image data;
   a LiDAR sensor for generating point cloud data;
   a real-time kinematic sensor for localization; and
   one or more inclination sensors.

3. The computer-implemented method of claim 1 further comprising determining a local task region using a rectangular definition or sector-based definition and a set of parameter values comprising area center swing angle, area angle range or width, near-end distance, and remote-end distance.

4. The computer-implemented method of claim 3 wherein the sub-task regions are determined by the high-level task planner by performing steps comprising:
   given the local task region for the excavator and an area over which the task is to be performed, determining a number of local task regions that at least covers the area.

5. The computer-implemented method of claim 1 wherein the step of given the sequence of sub-task regions, associated goals, and state information obtained from the perception module, using a material removal sub-task planner comprising one or more models to determine motion primitives and related parameter values for each sub-task region to accomplish the goal for that sub-task region comprises:
   for a sub-task region, implementing a set of one or more action planners according to a material removal sub-task planner model associated with the sub-task at the sub-task region until the sub-task goal is achieved; and
   responsive to the sub-task goal for the sub-task region being achieved and responsive to the sub-task region not being the last sub-task region in the sequence of sub-task regions, processing a next sub-task region in the sequence of sub-task regions.

6. The computer-implemented method of claim 1 wherein the material removal sub-task planner comprises:
- a point-of-attack (POA) planner;
- a dig motion planner; and
- a dump planner.

7. The computer-implemented method of claim 6 wherein the dig motion planner utilizes parameters comprising:
- $x_b$, $y_b$, $z_b$, which represents a point-of-attack (POA) location in base frame;
- $p_d$, which represents penetration depth;
- $p_l$, which represents penetration length;
- $d_l$, which represents drag length, and
- $\delta$, which represents entire dig motion tilt angle with respect to horizon plane.

8. The computer-implemented method of claim 1 wherein:
- the states information for the base move sub-task planner comprises excavator joint states, excavator base pose, and one or more environment states of a working area of the excavator; and
- the states information for the base move sub-task planner comprises excavator base pose and one or more environment states of a working area of the excavator.

9. The computer-implemented method of claim 1 wherein an end condition of a sub-task goal may be defined according to different levels of strictness requirement.

10. A system comprising:
- one or more processors; and
- a non-transitory computer-readable medium or media comprising one or more sets of instructions which, when executed by at least one of the one or more processors, causes steps to be performed comprising:
  - receiving, from a user, a task for an excavator and associated task parameter values;
  - given the task, the associated task parameter values, at least some of perception-related data received from a perception module, using a high-level task planner module comprising one or more rules-based models to divide the task into one or more base move sub-tasks and one or more material removal sub-tasks, wherein the one or more base move sub-tasks comprise a sequence of route points and the one or more material removal sub-tasks comprise a sequence of sub-task regions and a goal for each sub-task region;
  - given the sequence of route points and states information wherein at least some of the states information is obtained from the perception module, using a base move sub-task planner that comprises one or more models to generate a set of one or more waypoints between consecutive pairs of route points to guide the excavator between route points;
  - given the sequence of sub-task regions, associated goals, and states information wherein at least some of the states information is obtained from the perception module, using a material removal sub-task planner comprising one or more planner models to determine motion primitives and related parameter values for each sub-task region to accomplish the goal for that sub-task region;
  - using the motion primitives, related parameters, excavator parameters, and perception module data as inputs to a joint move primitive module to generate joint trajectories and using waypoints, excavator parameters, and perception module data as inputs to a base move primitive module to generate base trajectories; and
  - providing the joint trajectories and base trajectories to joint controller module(s) and base controller module(s), respectively, to generate controller commands to control devices of the excavator.

11. The system of claim 10 wherein the perception module comprises or receives data from one or more sensors comprising:
- a camera for image data;
- a LiDAR sensor for generating point cloud data;
- a real-time kinematic sensor for localization; and
- one or more inclination sensors.

12. The system of claim 10 wherein the non-transitory computer-readable medium or media further comprises one or more sets of instructions which, when executed by at least one of the one or more processors, causes steps to be performed comprising:
- determining a local task region using a rectangular definition or sector-based definition and a set of parameter values comprising area center swing angle, area angle range or width, near-end distance, and remote-end distance.

13. The system of claim 10 wherein the step of given the sequence of sub-task regions, associated goals, and state information obtained from the perception module, using a material removal sub-task planner comprising one or more models to determine motion primitives and related parameter values for each sub-task region to accomplish the goal for that sub-task region comprises:
- for a sub-task region, implementing a set of one or more action planners according to a material removal sub-task planner model associated with the sub-task at the sub-task region until the sub-task goal is achieved; and
- responsive to the sub-task goal for the sub-task region being achieved and responsive to the sub-task region not being the last sub-task region in the sequence of sub-task regions, processing a next sub-task region in the sequence of sub-task regions.

14. The system of claim 10 wherein the material removal sub-task planner comprises:
- a point-of-attack (POA) planner;
- a dig motion planner; and
- a dump planner.

15. The system of claim 14 wherein the dig motion planner utilizes parameters comprising:
- $x_b$, $y_b$, $z_b$, which represents a point-of-attack (POA) location in base frame;
- $p_d$, which represents penetration depth;
- $p_l$, which represents penetration length;
- $d_l$, which represents drag length, and
- $\delta$, which represents entire dig motion tilt angle with respect to horizon plane.

16. The system of claim 10 wherein:
- the states information for the base move sub-task planner comprises excavator joint states, excavator base pose, and one or more environment states of a working area of the excavator; and
- the states information for the base move sub-task planner comprises excavator base pose and one or more environment states of a working area of the excavator.

17. A non-transitory computer-readable medium or media comprising one or more sequences of instructions which, when executed by at least one processor, causes steps to be performed comprising:
- receiving, from a user, a task for an excavator and associated task parameter values;
- given the task, the associated task parameter values, at least some of perception-related data received from a perception module, using a high-level task planner module comprising one or more rules-based models to divide the task into one or more base move sub-tasks and one or more material removal sub-tasks, wherein the one or more base move sub-tasks comprise a sequence of route points and the one or more material removal sub-tasks comprise a sequence of sub-task regions and a goal for each sub-task region;

given the sequence of route points and states information wherein at least some of the states information is obtained from the perception module, using a base move sub-task planner that comprises one or more models to generate a set of one or more waypoints between consecutive pairs of route points to guide the excavator between route points;

given the sequence of sub-task regions, associated goals, and states information wherein at least some of the states information is obtained from the perception module, using a material removal sub-task planner comprising one or more planner models to determine motion primitives and related parameter values for each sub-task region to accomplish the goal for that sub-task region;

using the motion primitives, related parameters, excavator parameters, and perception module data as inputs to a joint move primitive module to generate joint trajectories and using waypoints, excavator parameters, and perception module data as inputs to a base move primitive module to generate base trajectories; and providing the joint trajectories and base trajectories to joint controller module(s) and base controller module(s), respectively, to generate controller commands to control devices of the excavator.

18. The non-transitory computer-readable medium or media of claim 17 wherein the step of given the sequence of sub-task regions, associated goals, and state information obtained from the perception module, using a material removal sub-task planner comprising one or more models to determine motion primitives and related parameter values for each sub-task region to accomplish the goal for that sub-task region comprises:
  for a sub-task region, implementing a set of one or more action planners according to a material removal sub-task planner model associated with the sub-task at the sub-task region until the sub-task goal is achieved; and
  responsive to the sub-task goal for the sub-task region being achieved and responsive to the sub-task region not being the last sub-task region in the sequence of sub-task regions, processing a next sub-task region in the sequence of sub-task regions.

19. The non-transitory computer-readable medium or media of claim 17 wherein the material removal sub-task planner comprises:
  a point-of-attack (POA) planner;
  a dig motion planner; and
  a dump planner.

20. The non-transitory computer-readable medium or media of claim 17 wherein:
  the states information for the base move sub-task planner comprises excavator joint states, excavator base pose, and one or more environment states of a working area of the excavator; and
  the states information for the base move sub-task planner comprises excavator base pose and one or more environment states of a working area of the excavator.

* * * * *